(12) United States Patent
Matsushita

(10) Patent No.: US 7,556,391 B2
(45) Date of Patent: Jul. 7, 2009

(54) TRANSMITTANCE ADJUSTER UNIT, A PLANAR ILLUMINATION DEVICE, A LIQUID CRYSTAL DISPLAY DEVICE USING THE SAME, AND A METHOD OF ARRANGING TRANSMITTANCE ADJUSTERS

(75) Inventor: Motohiko Matsushita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 147 days.

(21) Appl. No.: 11/661,995

(22) PCT Filed: Sep. 6, 2005

(86) PCT No.: PCT/JP2005/016318

§ 371 (c)(1),
(2), (4) Date: Mar. 6, 2007

(87) PCT Pub. No.: WO2006/028080

PCT Pub. Date: Mar. 16, 2006

(65) Prior Publication Data

US 2008/0089091 A1    Apr. 17, 2008

(30) Foreign Application Priority Data

Sep. 6, 2004 (JP) .............................. 2004-258340

(51) Int. Cl.
*G01D 11/28* (2006.01)
(52) U.S. Cl. ........................ 362/29; 362/246; 362/607
(58) Field of Classification Search .................. 362/29, 362/30, 223, 224, 241, 244, 246, 606, 607, 362/623, 624, 625; 359/599
See application file for complete search history.

(56) References Cited

U.S. PATENT DOCUMENTS

| 6,561,663 | B2 * | 5/2003 | Adachi et al. | ................. 362/29 |
| 2004/0042194 | A1 * | 3/2004 | Hsieh | ......................... 362/29 |
| 2007/0147073 | A1 * | 6/2007 | Sakai et al. | ................ 362/607 |

FOREIGN PATENT DOCUMENTS

JP       05-127156       5/1993

(Continued)

OTHER PUBLICATIONS

International Preliminary Report on Patentability for PCT/JP2005/016318 dated Mar. 29, 2007.

*Primary Examiner*—Y My Quach Lee
(74) *Attorney, Agent, or Firm*—Sughrue Mion, PLLC

(57) ABSTRACT

A transmittance adjuster unit includes multiple transmittance adjusters arranged in a predetermined pattern, if the pattern density is $\rho(x, y)$, the maximum luminance $F_{max}$ of the light emitted from the light emission plane of a planar illumination device when the unit is not provided is 1, the minimum luminance is $F_{min}$, and the relative luminance with respect to the maximum luminance $F_{max}$ of the light emitted from a predetermined position $(x, y)$ of the emission plane is $F(x, y)$, the relationship between the luminance $F(x, y)$ and the pattern density $\rho(x, y)$ satisfies the following expression: $\rho(x, y)=c\{F(x, y)-F_{min}\}/(F_{max}-F_{min})$, wherein $0.5 \leq c \leq 1$. This unit is thin and lightweight, and can reduce unevenness of the luminance without reducing the average luminance of the incident light. The planar illumination device includes the transmittance adjuster unit and a liquid crystal display device includes the planar illumination device.

15 Claims, 20 Drawing Sheets

FOREIGN PATENT DOCUMENTS

| | | |
|---|---|---|
| JP | 05-249320 | 9/1993 |
| JP | 06-235825 | 8/1994 |
| JP | 08-062426 | 3/1996 |
| JP | 08-122537 | 5/1996 |
| JP | 8-122537 A | 5/1996 |
| JP | 9-204809 A | 8/1997 |
| JP | 09-236803 | 9/1997 |
| JP | 9-236803 A | 9/1997 |
| JP | 09-304623 | 11/1997 |
| JP | 10-133027 | 5/1998 |

* cited by examiner (a)

(b)

(a)

(b)

TRANSMITTANCE ADJUSTER UNIT, A PLANAR ILLUMINATION DEVICE, A LIQUID CRYSTAL DISPLAY DEVICE USING THE SAME, AND A METHOD OF ARRANGING TRANSMITTANCE ADJUSTERS

TECHNICAL FIELD

This invention relates to a transmittance adjuster unit that enables light emitting from the light emission plane of a light guide plate to become more uniform, as well as a planar illumination device that emits uniform light from the light emission plane, a liquid crystal display device using the same, and a method of arranging transmittance adjusters.

BACKGROUND ART

A liquid crystal display device is provided with a backlight unit that applies light to the back side of a liquid crystal panel (LCD) so as to illuminate it. The backlight unit is composed of such components as an illuminating light source, a light guide plate that diffuses light emitted from the light source so that it is applied to the liquid crystal panel, a prism sheet or diffusion sheet for rendering the light emitted from the light guide plate to become uniform.

A known example of such backlight unit is disclosed in Patent Document 1.

FIG. 25 is a schematic sectional view of an area light source device disclosed in Patent Document 1.

The area light source device (backlight unit) shown in FIG. 25 is formed by embedding fluorescent lamps 102 in a light guide plate 100, then providing a reflective sheet 104 on a rear surface of the light guide plate 100 and superposing a transmitted light amount correcting sheet 106, a light diffuser 108, and a prism sheet 110 on the light emission plane of the light guide plate 100.

The light guide plate 100 has a substantially rectangular shape and is made of a resin having dispersed therein fine particles that can diffuse illuminating light. In addition, the light guide plate 100 has a flat top surface, which is used as the emission plane. Further, grooves 100a each having a U-shaped cross section are formed in the rear surface (away from the emission plane) of the light guide plate 100 such that the fluorescent lamps 102 can be fitted into those grooves. A light amount correcting surface 100b for promoting the emission of illuminating light is formed on the emission plane of the light guide plate 100, except in portions just above the fluorescent lamps 102.

As mentioned above, Patent Document 1 shows that not only by forming the light guide plate 100 with the fine particles mixed therein but also by promoting the emission of the illuminating light with the aid of the light amount correcting surface 100b formed on a part or all of the emission plane except in the portions just above the fluorescent lamps 102, the total thickness of the device can be made small enough while at the same time any unnatural luminance irregularities that might occur to the emitting light can be reduced.

In order to produce a backlight for liquid crystal display devices that enables the liquid crystal display device to be reduced in size, weight and thickness while permitting smaller cost and lower power consumption and yet without reducing the amount of light applied from the backlight, Patent Document 2 discloses a light guide plate having a rectangular surface for light application, a groove having a rectangular cross section which is gouged out in the central portions of the shorter sides to extend in parallel with the longer sides and in which a light source is to be inserted, and a rear surface formed such that the thickness of the plate gradually decreases from the groove toward both lateral surfaces on the longer sides.

In order to produce a backlight unit that enables a liquid crystal display device to have a narrow enough frame and a small enough thickness to assure brightness with high utilization of light, Patent Document 3 discloses a light guide member (light guide plate) having such a concave portion for accommodating a light source that its cross section as taken parallel to the width direction is of a parabolic shape with the major axis running in the depth direction.

In addition, Patent Document 4 discloses a light guide plate which, in order to ensure that the in-plane brightness of a display panel is kept uniform to provide illumination of high luminance, places a plurality of plate-like light waveguide layers in superposition on a substantially V-shaped high-reflection layer so as to provide an increasing scale of refractive index and uses the light emitted from the light emitting end face of each waveguide layer in order to realize a brighter light diffusion layer. The concave portion formed in the light guide plate to accommodate the light source is of a triangular shape.

However, the light guide plates described above all suffer the problem of causing luminance irregularities to the illuminating light emitting from the emission plane.

For example, the light guide plate 100 disclosed in Patent Document 1 has the light sources (fluorescent lamps) 102 fitted into the grooves 100a with a circular cross section and, as shown in FIG. 26, the luminance peaks due to the light sources 102 remain unresolved.

In view of this, in order that it can be used as a planar light source device, the light guide plate 100 has the transmitted light amount correcting sheet 106, the light diffuser 108, and the prism sheet 110 provided on a side closer to its emission plane, thereby removing unnatural luminance irregularities that will occur on the emission plane.

The transmitted light amount correcting sheet 106 is prepared by forming a tiny dotted pattern of metal film over a transparent polyester film. The dotted pattern is formed in such a way that the dot density is highest just above the fluorescent lamps 102 and gradually decreases with the increasing distance from the fluorescent lamps. Designed this way, the transmitted light amount correcting sheet 106 reflects part of the illuminating light emitted by the light guide plate 100 and brings it back into the light guide plate so that the distribution of the quantity of the transmitted light becomes uniform.

The light diffuser 108 is formed of a semitransparent milk-white acrylic plate and it diffuses the light emitted from the transmitted light amount correcting sheet 106 so that it emits with a desired distribution of quantity.

The prism sheet 110 is a light controlling member that corrects the directivity of the emitting light; it is formed of a sheeting of a light-transmitting material such as polycarbonate and has a prism surface formed on the side remote from the light guide plate. The prism surface is comprised of repeated projections with a triangular cross section that extend almost parallel to one another in one direction. It is by the inclined surfaces of these triangular projections that the prism sheet 110 corrects the emitting light to exit such that its primary direction of emission is toward the front side of the emission plane.

Thus, Patent Document 1 claims that by means of the light amount correcting sheet 106, the light diffuser 108, and the prism sheet 110, the irregular light emitting from the emission plane of the light guide plate 100 is diffused to ensure emission of uniform light.

In addition, various methods have been proposed with a view to diffusing light as it emits from the light guide plate (see Patent Documents 5 and 6).

For example, Patent Document 5, as shown in FIG. 10, thereof, discloses a liquid crystal display device having a dotted area printed on a surface of a diffuser plate in order to block light transmission. The printed dots are dense in the region 39A where a cold cathode fluorescent lamp 36 is positioned right beneath it while their density decreases with the increasing distance from that region. This document states that by this design, the quantity of light emitted toward the diffuser plate becomes uniform as it reaches every part of the plate.

Patent Document 6 discloses an area light source device that has a light quantity adjusting layer provided on a surface opposite a linear light source for ensuring that part of the light radiated from the upper surface is reflected and scattered back to a light guide plate. This document states that the light quantity adjusting layer may be formed in such a way that its area percentage decreases with the increasing distance from the linear light source or that it may be formed only in the neighborhood of the linear light source. The document further comments that while the transparent flat plate is typically made of a light-transmitting resin or film, it may be replaced by a light diffusing plate to ensure that the light emitted from the light guide plate and the linear light source toward the upper surface has a smooth intensity distribution.

Patent Document 1: JP 9-304623 A
Patent Document 2: JP 8'-62426 A
Patent Document 3: JP 10-133027 A
Patent Document 4: JP 5-249320 A
Patent Document 5: JP 5-127156 A
Patent Document 6: JP 6-235825 A

DISCLOSURE OF THE INVENTION

Problems to be Solved by the Invention

In general, the luminance irregularities that occur to the light emitting from the emission plane of the light guide plate can be reduced by providing more diffuser plates. However, in order to reduce the luminance irregularities, a sufficiently thick (about 5 mm) diffuser plate needs to be used and this results in a thicker and heavier planar illumination device.

In this connection, the planar illumination device disclosed in Patent Document 1 claims that it emits uniform light using the light amount correcting sheet, the diffuser and the prism sheet; however, this planar illumination device suffers the problem of being able to reduce the luminance irregularities only insufficiently.

Even the liquid crystal display device disclosed in the aforementioned Patent Document 5 and the area light source device disclosed in Patent Document 6 suffer the practical problems of experiencing difficulty in reducing the luminance irregularities and being incapable of reducing them by a sufficient degree.

A first object of the present invention is to solve the aforementioned problems of the prior art and provide a transmittance adjuster unit that is thin, lightweight, that will not reduce the average luminance of incident light and which yet can reduce the unevenness of the luminance, as well as a method of arranging transmittance adjusters.

A second object of the present invention is to solve the aforementioned problems of the prior art and provide a planar illumination device that is thin, lightweight, can be manufactured at a lower cost, that can emit illuminating light of greater uniformity, smaller unevenness and higher luminance, and which can be applied to liquid crystal display devices such as a wall-hung TV.

A third object of the present invention is to solve the aforementioned problems of the prior art and provide a liquid crystal display device that is thin, lightweight, can be manufactured at a lower cost, that can realize display of greater uniformity, smaller unevenness and higher luminance, and which can be designed as a wall-mounted type such as a wall-hung TV.

Means to Solve the Problems

In order to attain the first object described above, a first aspect of the present invention provides a transmittance adjuster unit that is provided on a side closer to a light emission plane of a light guide plate of a planar illumination device having at least a light source and the flat light guide plate that causes light incident from the light source to emit from the light emission plane and that causes the light emitted from the light guide plate to diffuse for emitting the diffused light, comprising: multiple transmittance adjusters arranged in a predetermined pattern, wherein, if pattern density of the transmittance adjusters at a predetermined position (x,y) is written as $\rho(x,y)$, maximum luminance $F_{max}$ of the light emitted from the light emission plane of the planar illumination device when the transmittance adjuster unit is not provided is assumed to be unity, and relative luminance with respect to the maximum luminance $F_{max}$ of the light emitted from the predetermined position (x,y) of the light emission plane is written as $F(x,y)$, then relationship between the relative luminance $F(x,y)$ and the pattern density $\rho(x,y)$ satisfies the following expression:

$$\rho(x,y)=c\{F(x,y)-F_{min}\}/(F_{max}-F_{min})$$

wherein c satisfies $0.5 \leq c \leq 1$ and $F_{min}$ is minimum value of the relative luminance $F(x,y)$.

The transmittance adjuster unit is preferably formed of a film of transparent member.

It is also preferred that the transmittance adjusters be arranged in a dotted pattern.

It is also preferred that the transmittance adjusters, when arranged to cover an entire surface of a predetermined region, provide a transmittance of from 10% (inclusive) to 50% (inclusive).

In order to attain the second object described above, a first mode of a second aspect of the present invention provides a planar illumination device comprising: a light source; a light guide plate that causes incident light from the light source to emit from a light emission plane; a reflective sheet provided on a surface of the light guide plate away from the light emission plane; a reflector provided on a facing side of the light guide plate with the light source interposed; a diffusion film provided on the light emission plane of the light guide plate; and a transmittance adjuster unit that is provided on any one surface of the light emission plane of the light guide plate, a surface of the diffusion film closer to the light guide plate and an opposite surface of the diffusion film away from the light guide plate, and that is composed of multiple transmittance adjusters arranged in a predetermined pattern, wherein, if pattern density of the transmittance adjusters at a predetermined position (x,y) of the transmittance adjuster unit is written as $\rho(x,y)$, maximum luminance $F_{max}$ of the light emitted from the light emission plane of the planar illumination device when the transmittance adjuster unit is not provided is assumed to be unity, and relative luminance with respect to the maximum luminance $F_{max}$ of the light emitted from the predetermined position (x,y) of the light emission plane is written as F(x,y), then relationship between the relative luminance F(x,y) and the pattern density ρ(x,y) satisfies the following expression:

$$\rho(x,y)=c\{F(x,y)-F_{min}\}/(F_{max}-F_{min})$$

wherein c satisfies $0.5 \leq c \leq 1$ and $F_{min}$ is minimum value of the relative luminance F(x,y).

Preferably, the planar illumination device further comprises: a prism sheet arranged on at least one of a surface of the diffusion film closer to the light guide plate and an opposite surface of the diffuser film away from the light guide plate.

In order to attain the second object described above, a second mode of the second aspect of the present invention provides a planar illumination device comprising: a light source; a light guide plate that causes incident light from the light source to emit from a light emission plane; a reflective sheet provided on a surface of the light guide plate away from the emission plane; a reflector provided on a facing side of the light guide plate with the light source interposed; a diffusion film provided on the light emission plane of the light guide plate; a prism sheet arranged on at least one of a surface of the diffusion film closer to the light guide plate and an opposite surface of the diffusion film away from the light guide plate; and a transmittance adjuster unit that is provided on any one surface of the light emission plane of the light guide plate, a surface of the prism sheet closer to the light guide plate, an opposite surface of the prism sheet away from the light guide plate, the surface of the diffusion film closer to the light guide plate, and the opposite surface of the diffusion film away from the light guide plate, and that is composed of multiple transmittance adjusters arranged in a predetermined pattern, wherein if pattern density of the transmittance adjusters at a predetermined position (x,y) of the transmittance adjuster unit is written as ρ(x,y), maximum luminance $F_{max}$ of the light emitted from the light emission plane of the planar illumination device when the transmittance adjuster unit is not provided is assumed to be unity, and relative luminance with respect to the maximum luminance $F_{max}$ of the light emitted from the predetermined position (x,y) of the light emission plane is written as F(x,y), then relationship between the relative luminance F(x,y) and the pattern density ρ(x,y) satisfies the following expression:

$$\rho(x,y)=c\{F(x,y)-F_{min}\}/(F_{max}-F_{min})$$

wherein c satisfies $0.5 \leq c \leq 1$ and $F_{min}$ is minimum value of the relative luminance F(x,y).

In each of the first and second modes of the second aspect of the present invention, the transmittance adjuster unit is preferably formed of a film of transparent member.

It is also preferred that the transmittance adjusters be arranged in a dotted pattern.

It is also preferred that the transmittance adjusters, when arranged to cover an entire surface of a predetermined region, provide a transmittance of from 10% (inclusive) to 50% (inclusive), more preferably from 20% (inclusive) to 40% (inclusive).

In yet another preferred embodiment, the light guide plate is composed of: a rectangular light emission plane; a thick portion parallel to one side of the rectangular light emission plane and positioned substantially in its center; thin end portions formed parallel to the thick portion; a parallel groove for accommodating the light source, which is formed substantially in the center of the thick portion and parallel to said one side, and inclined rear-surface portions on opposite sides of the parallel groove that are symmetrical with respect to a plane including an axis of the light source and normal to the light emission plane and which decrease in thickness from the thick portion toward the thin end portions on the opposite sides in a direction perpendicular to said one side so as to form inclined rear surfaces.

In order to attain the third object described above, a third aspect of the present invention provides a liquid crystal display device comprising: a backlight unit comprising each of the planar illumination devices of the second aspect described above; a liquid crystal display panel provided on a side of the backlight unit closer to the light emission plane; and a drive unit for driving the backlight unit and the liquid crystal display panel.

Further, in order to attain the first object described above, a fourth aspect of the present invention provides a method of arranging multiple transmittance adjusters to construct a transmittance adjuster unit that is provided on a side closer to a light emission plane of a light guide plate of a planar illumination device having at least a light source and the flat light guide plate that causes light incident from the light source to emit from the light emission plane and that causes the light emitted from the light guide plate to diffuse for emitting the diffused light, wherein the transmittance adjusters are provided such that if pattern density of the transmittance adjusters at a predetermined position (x,y) of the transmittance adjuster unit is written as ρ(x,y), maximum luminance $F_{max}$ of the light emitted from the light emission plane of the planar illumination device when the transmittance adjuster unit is not provided is assumed to be unity, and relative luminance with respect to the maximum luminance $F_{max}$ of the light emitted from the predetermined position (x,y) of the light emission plane of the planar illumination device is written as F(x,y), then relationship between the relative luminance F(x,y) and the pattern density ρ(x,y) satisfies the following expression:

$$\rho(x,y)=c\{F(x,y)-F_{min}\}/(F_{max}-F_{min})$$

wherein c satisfies $0.5 \leq c \leq 1$ and $F_{min}$ is minimum value of the relative luminance F(x,y).

Effects of the Invention

According to the first and fourth aspects of the present invention, the pattern density of the transmittance adjusters that compose the transmittance adjuster unit satisfies the relationship set forth above and this enables light to be emitted from the light emission plane with the luminance unevenness being reduced efficiently but without lowering its luminance. In addition, since the luminance unevenness can be reduced efficiently, there is offered the advantage of permitting the use of an even thinner and more lightweight diffusion film.

According to the second aspect of the present invention, the planar illumination device has the transmittance adjuster unit provided on the light emission plane of the light guide plate, the side of the diffusion film closer to the light guide plate, or on the side of the diffusion film away from the light guide plate, or if a prism sheet is provided, the transmittance adjuster unit may be provided on the side of the prism sheet closer to the light guide plate or on the side of the prism sheet away from the light guide plate, and the pattern density of the transmittance adjuster unit satisfies the relationship set forth above; as a result, the luminance unevenness can be reduced efficiently and the diffusion film can be made thinner. In addition, with the luminance unevenness being reduced efficiently, the efficiency of light emission can be sufficiently increased that light of high luminance can be emitted even from a light source of low luminance.

As a result, there can be provided a planar illumination device that is thin, lightweight, can be manufactured at a lower cost, that can emit illuminating light of greater uniformity, smaller unevenness and higher luminance, and which can be applied to liquid crystal display devices such as a wall-hung TV.

According to a third aspect of the present invention, by using the planar illumination device according to the second aspect described above, there can be provided a liquid crystal display device that is thin, lightweight, can be manufactured at a lower cost, that can realize display of greater uniformity, smaller unevenness and higher luminance, and which can be designed as a wall-mounted type such as a wall-hung TV.

BEST MODE FOR CARRYING OUT THE INVENTION

Hereinafter, the transmittance adjuster unit, the planar illumination device, the liquid crystal display device using the same, and the method of arranging transmittance adjusters according to the present invention will be described in detail based on the preferred embodiments shown in the accompanying drawings.

Figure 1:
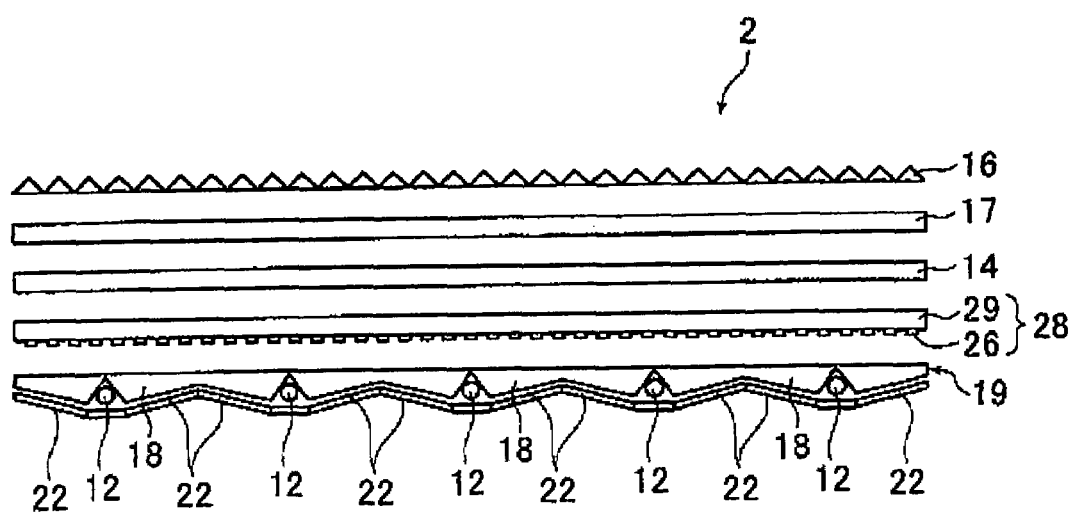
FIG. 1 is a diagrammatic sectional view showing a schematic composition according to one embodiment of a planar illumination device in which a plurality of light guide plates having the transmittance adjuster unit of the present invention are arranged side by side.

FIG. 1 is a schematic sectional view of a planar illumination device (hereinafter also referred to as a backlight unit) 2 according to the second aspect of the present invention that has a transmittance adjuster unit 28 according to the first aspect of the present invention. The planar illumination device 2 is used as a backlight unit for the liquid crystal display device according to the third aspect of the present invention. FIGS. 2(a) and (b) are a schematic partial perspective view and a schematic partial section that show part of a single light guide plate unit 18 in the backlight unit 2 shown in FIG. 1, as well as the liquid crystal display device 10 using this backlight unit 2. As shown in FIGS. 1, 2(a) and (b), the liquid crystal display device 10 basically includes the backlight unit 2, a liquid crystal display panel 4 disposed on the side of the backlight unit 2 closer to the light emission plane, and a drive unit 6 for driving those components (its connection to the backlight unit 2 is not shown).

The backlight unit 2 is a planar illumination device for applying uniform light to the entire surface of the liquid crystal display panel 4 from its rear side and it has a light emission plane (light emitting surface) of substantially the same size as an image display surface of the liquid crystal display panel 4. As shown in FIG. 1, the backlight unit 2 is basically provided with a light source 12, a diffusion film 14, two prism sheets 16 and 17, a light guide plate assembly 19, a reflector 20, a reflective sheet 22, and a transmittance adjuster unit 28. As shown in FIG. 1, the light guide plate assembly 19 used in the backlight unit 2 according to the embodiment under consideration is composed of more than one light guide plate unit 18.

In FIGS. 2(a) and (b), the light source 12 is a small-diameter rod of cold-cathode tube, which is used for illuminating the liquid crystal display panel 4. The light source 12 is provided inside a parallel groove 18f formed in the light guide plate unit 18 and connected to the drive unit 6 (the connection is not shown). In the case under consideration, the light source 12 is the cold-cathode tube, but this is not the sole case of the present invention and any rod of light source may be used. The light source 12 may, for example, be an ordinary fluorescent tube or an LED (light emitting diode).

For example, a transparent light guide member in either a cylindrical or a prismatic form comparable in length to the parallel groove 18f in the light guide plate unit 18 may be provided with an LED on both of its top and bottom sides and the thus formed LED light source may be substituted for the light source 12. With such LED light source, light from the LED can be admitted through the top and bottom sides of the light guide member and then allowed to emit from its lateral sides.

The light guide plate unit 18 includes a rectangular light emission plane 18a, a thick portion 18b parallel to one side of it, thin end portions 18c formed on opposite sides of the thick portion 18b parallel to said one side, inclined rear-surface portions 18e that decrease in thickness from the thick portion 18b toward the thin end portions 18c on opposite sides in a direction perpendicular to said one side so as to form inclined surfaces 18d, and the parallel groove 18f for accommodating the light source 12 which is formed in the thick portion 18b parallel to said one side. Thus, the light guide plate unit 18 is a flat plate whose surface assumes a rectangular outer shape and is formed of a transparent resin. The light guide plate unit 18 is flat on one surface, which is inclined with respect to the other surface such that the plate thickness decreases toward one side. Here, the inclined surfaces 18d are formed flat but, if desired, they may be curved.

As shown in FIG. 1, the light guide plate unit 18 is symmetrical with respect to the center line passing through the center of the parallel groove 18f and extending normal to the light emission plane 18b of the light guide plate unit 18. The light guide plate assembly 19 is formed by coupling a plurality of light guide plate units 18 with adjacent ones being joined at their thin portions.

The parallel groove 18f for accommodating the light source 12 extends in a longitudinal direction in the thick portion 18b of the light guide plate unit 18 on the side away from the light emission plane 18a. The depth of the parallel groove 18f is preferably determined such that no part of the light source 12 will protrude from the underside of the light guide plate unit 18; it is preferably determined in consideration of the size of the light source 12, as well as the mechanical strength and aging of the light guide plate unit 18. In addition, the thicknesses of the thick portion 18b and thin end portions 18c of the light guide plate unit 18 can be altered freely in accordance with the size of the light source 12. Here, the parallel groove 18f of the light guide plate unit 18 may be formed in a direction normal to the longitudinal direction of the light guide plate unit 18, but it is preferably formed in the longitudinal direction in order to assure more efficient utilization of the light from the light source 12 accommodated in the parallel groove 18f.

With the light guide plate unit 18 having the structure shown in FIGS. 2(a) and 2(b), part of the light radiated from the light source 12 provided in the parallel groove 18f enters the light guide plate unit 18 through the sidewalls forming the parallel groove 18f, is reflected on the inclined surfaces 18d of the light guide plate unit 18 and then emits from the light emission plane 18a. At this time, part of the light leaks from the underside of the light guide plate unit 18, but the leaking light is reflected on the reflective sheet 22 to be described later which is formed on a side of the light guide plate unit 18 closer to the inclined surfaces 18d, whereupon it enters the light guide plate unit 18 again and then emits from the light emission plane 18a. Thus, uniform light is radiated from the light emission plane 18a of the light guide plate unit 18.

The light guide plate assembly 19 can be produced by, for example, extrusion or injection molding of a heated resin feed or casting polymerization of a monomer, an oligomer or the like in a mold. A material for the light guide plate assembly 19 is exemplified by transparent resins including polycarbonate, acrylic resins such as PMMA (polymethyl methacrylate), PET (polyethylene terephthalate), PP (polypropylene), PC (polycarbonate), PMMA (polymethyl methacrylate), benzyl methacrylate, an MS resin, other acrylic resins or a COP (cycloolefin polymer). The transparent resin may be mixed with fine particles to scatter light and this can further improve the efficiency of light emission from the light emission plane 18a.

In the embodiment under consideration, the parallel groove 18f in the light guide plate unit 18 is formed such that a section taken normal to the longitudinal direction of the parallel groove 18f (which is hereinafter referred to simply as a sectional shape of the parallel groove) will assume a triangular shape. The shape of the parallel groove 18*f* will be described later.

The prism sheets 16 and 17 are transparent sheets formed by arranging a plurality of prisms in parallel and they can enhance the condensing property of light emitted from the light emission plane 18*a* of the light guide plate 18 to provide improved luminance. One of the prism sheets 16 and 17 is provided in such a way that the prism array it has extends parallel to the parallel groove 18*f* in the light guide plate unit 18 whereas the other prism sheet is provided with a prism array extending normal to the parallel groove 18*f*. In other words, the prism sheets 16 and 17 are provided in such a way that their prism arrays extend in directions that are normal to each other. In addition, the prism sheet 16 is provided such that the vertex of each prism faces the light emission plane 18*a* of the light guide plate unit 18. To describe the order of placing the two prism sheets 16 and 17, the prism sheet 16 having prisms that extend in a direction parallel to the parallel groove in the light guide plate unit may be provided just above that light guide plate unit, and the prism sheet having prisms that extend in a direction normal to the parallel groove 18*f* in the light guide plate unit 18 may be provided on top of the prism sheet 16; the order of arrangement of the two prism sheets may be reversed.

In the illustrated case, the prism sheets are used but they may be replaced by sheets on which optical elements like the prism are regularly arranged. Further, sheets on which elements having a lens effect, for example, lenticulated lenses, concave lenses, convex lenses, or optical elements in pyramidal shape are regularly arranged may be substituted for the prism sheets.

Figure 3:
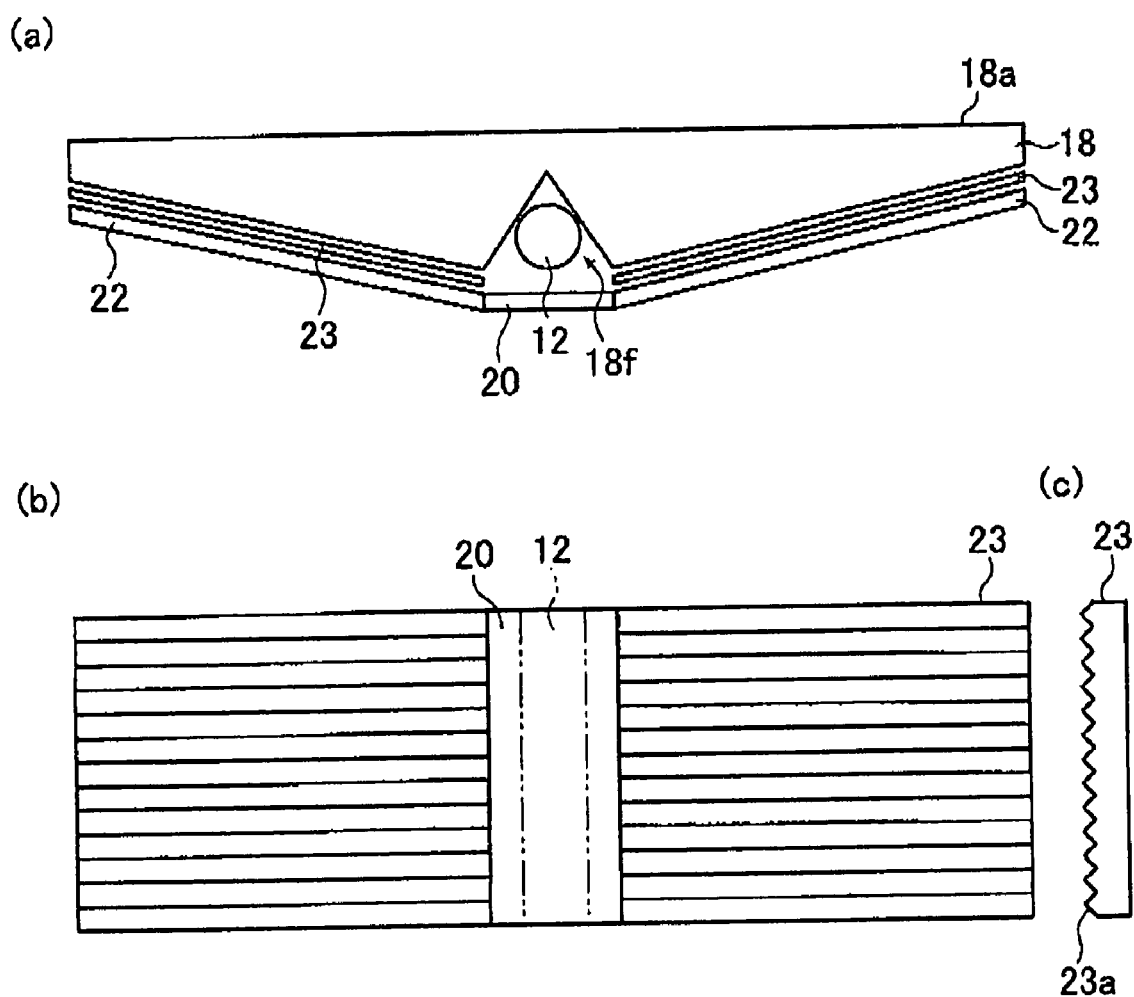
FIG. 3(a) is a diagrammatic longitudinal section showing a schematic composition according to another embodiment of a portion including a light guide plate, a prism sheet and a reflective sheet that are components of the planar illumination device of the present invention; (b) is a diagrammatic plan view of the prism sheet in the planar illumination device shown in (a) as it is seen from the light guide plate, and (c) is a diagrammatic side sectional view of the prism sheet shown in (b).

In the present invention, as shown in FIGS. 3(*a*) and (*b*), an additional prism sheet 23 is preferably provided between the reflective sheet 22 and the inclined surface 18*d* of the light guide plate unit 18 which is away from the light emission plane 18*a*. FIG. 3(*a*) is a schematic sectional view showing how the prism sheet 23 is provided between the reflective sheet 22 and the inclined surface 18*d* of the light guide plate unit 18; FIG. 3(*b*) is a schematic plan view of the prism sheet 23 between the reflective sheet 22 and the inclined surface 18*d* of the light guide plate unit 18 as it is seen from the light guide plate; FIG. 3(*c*) is a diagrammatic side (transverse) sectional view of the prism sheet shown in FIG. 3(*b*). The prism sheet 23 provided between the reflective sheet 22 and the inclined surface 18*d* of the light guide plate unit 18 is preferably provided such that prisms 23*a* extend in a direction normal to the parallel groove 18*f* in the light guide plate unit 18 and that the vertex of each prism 23*a* faces the inclined surface 18*d* of the light guide plate unit 18.

Here, the prism sheets are employed but they may be replaced by optical elements having a similar effect to the prism sheets; for example, sheets on which optical elements having the lens effect such as lenticulated lenses, concave lenses, convex lenses, or optical elements in pyramidal shape are regularly arranged may be provided.

In the illustrated case, the prism sheets 16 and 17, and preferably the prism sheet 23, are employed and it should be noted here that if the luminance on the light emission plane 18*a* as provided by the parallel groove 18*f* in the light guide plate unit 18 is already made sufficiently uniform, the prism sheet 23 is of course unnecessary and, what is more, either one of the prism sheets 16 and 17 or even both may be omitted. Using a smaller number of expensive prism sheets or totally omitting prism sheets contributes to reducing the equipment cost.

Figure 2:
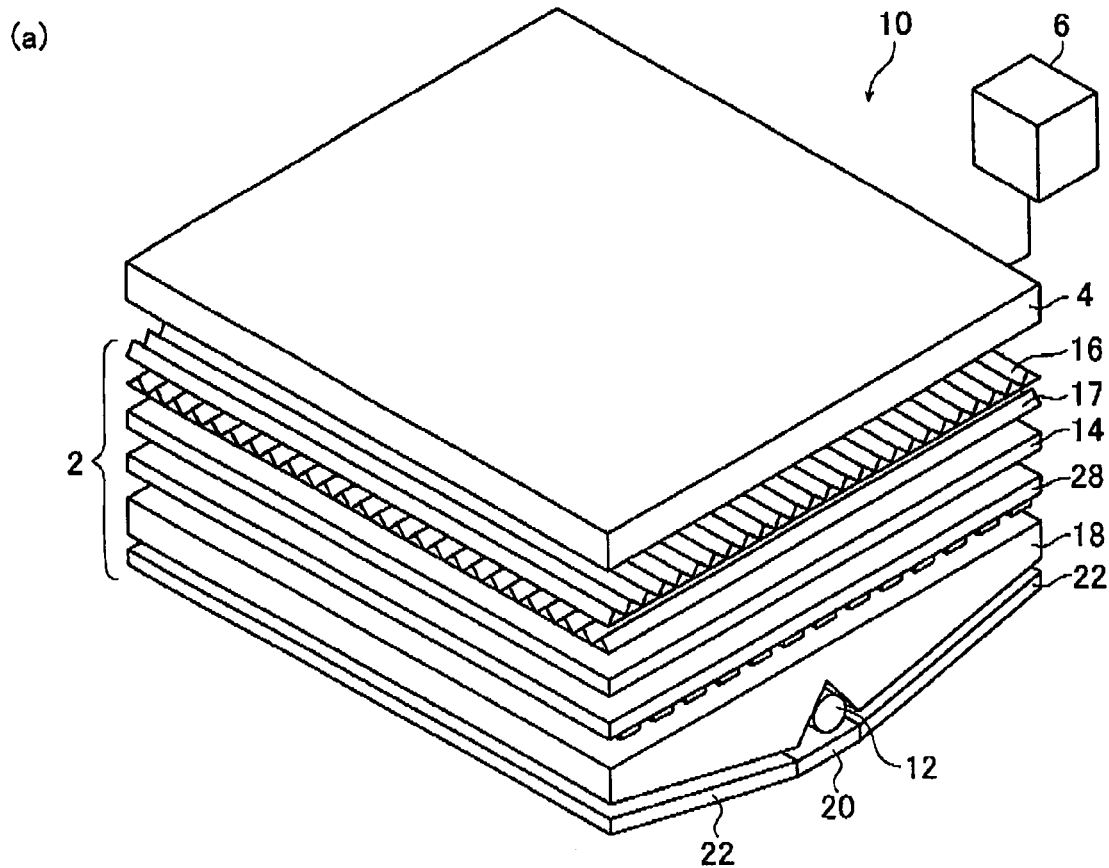
FIGS. 2(a) and (b) are a schematic perspective view and a schematic sectional view, respectively, according to one embodiment of a liquid crystal display device using a planar illumination device having the transmittance adjuster unit of the present invention.
Figure 2:
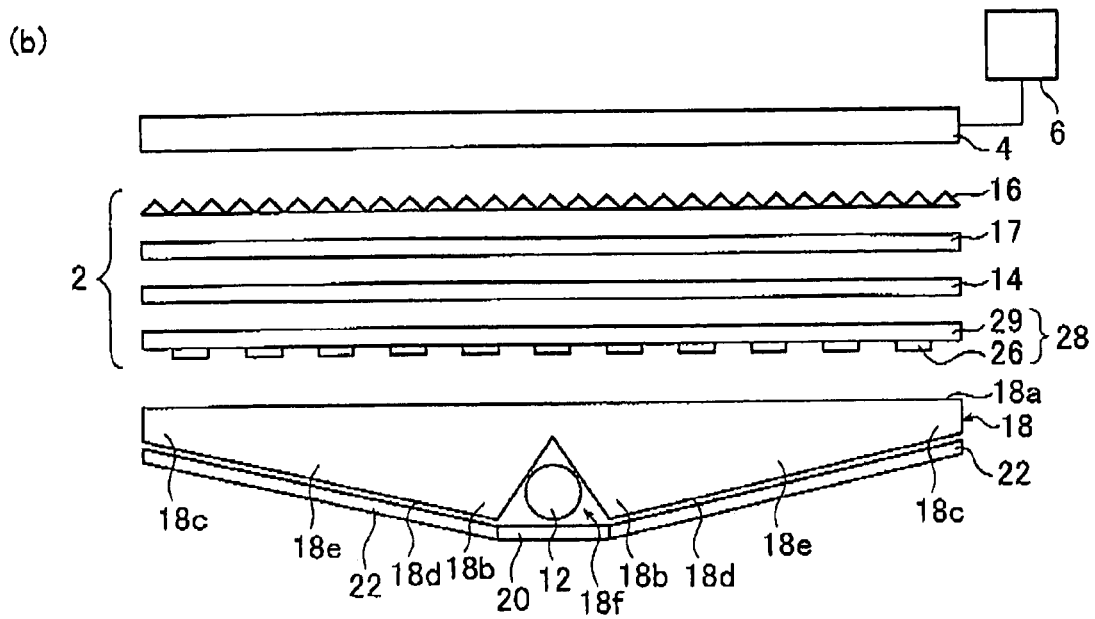

Referring to FIG. 2, the reflective sheet 22 is for causing the light leaking from the rear surface (the underside in FIG. 2) of the light guide plate unit 18 to be reflected so it enters the light guide plate unit 18 again; it can thus improve the efficiency of light utilization. The reflective sheet 22 is so formed as to cover the underside (inclined surfaces) of the light guide plate unit 18. The reflector 20 is placed behind the light source 12 in such a way as to bridge the parallel groove 18*f* in the light guide plate unit 18. The reflector 20 reflects the light from the underside of the light source 12 so it can be admitted into the light guide plate unit 18 through the sidewall surfaces of the parallel groove 18*f*.

The reflective sheet 22 may be formed of any material that is capable of reflecting the light leaking from the rear surface (the underside in FIG. 2) of the light guide plate unit 18; exemplary materials that can be used to form the reflective sheet include; a resin sheet made from PET, PP (polypropylene), etc. by kneading them with a filler and then drawing the resultant mixture to thereby form voids which increase reflectivity; a transparent resin sheet or a white resin sheet of the type described above that have their surface mirror-finished by aluminum vapor deposition or the like; a metal foil such as an aluminum foil or a resin sheet carrying the metal foil; and a thin metal plate having sufficient surface reflectivity. The reflector 20 may, for example, be formed of the same material as the above-mentioned reflective sheet, namely, the resin material, metal foil or the metal plate that have been provided with sufficient reflecting property on the surface.

The diffusion film 14 shown in FIG. 2 is for diffusing the light emitting from the light emission plane 18*a* of the light guide plate unit 18 so that it becomes uniform; this is formed by imparting light diffusing property to a film-shaped member that is made of an optically transparent resin such as PET (polyethylene terephthalate), PP (polypropylene), PC (polycarbonate), PMMA (polymethyl methacrylate), benzyl methacrylate, an MS resin, other acrylic resins or COP (cycloolefin polymer). The method of forming the diffusion film 14 is not particularly limited but it may be formed by, for example, imparting diffusing property to the surface of the above-described member in the form of a flat plate through fine embossing or polishing so as to roughen it (hereinafter, the thus treated surface is referred to as a "sanded surface"), or by coating the surface with a material that scatters light, as exemplified by a pigment such as silica, titanium oxide or zinc oxide, a resin, or beads of glass or zirconium, together with a binder, or by kneading the aforementioned resin with the above-mentioned pigment or beads that scatter light. In the present invention, the diffusion film 14 may be of a matted or coated type.

In the present invention, the diffusion film 14 is preferably a film-shaped member in a thickness of not more than 500 µm that is made of any of the above-mentioned materials and which has been provided with the light diffusing property.

The diffusion film 14 is preferably provided at a predetermined distance from the light emission plane 18*a* of the light guide plate unit 18, which distance can be varied as appropriate for the distribution of light quantity from the light emission plane 18*a* of the light guide plate unit 18. By thus keeping the diffusion film 14 a predetermined distance from the light emission plane 18*a* of the light guide plate unit 18, the light emitting from the light emission plane 18*a* of the light guide plate unit 18 is subjected to further mixing in the space between the light emission plane 18*a* and the diffusion film 14. As a result, the luminance of the light that passes through the diffusion film 14 to illuminate the liquid crystal display panel 4 can be made even more uniform. An exemplary method of keeping the diffusion film 14 a predetermined distance from the light emission plane 18a of the light guide plate unit 18 is by providing a spacer between the diffusion film 14 and the light guide plate unit 18.

In particular, if the backlight unit 2 can be made a little thicker than usual, there is no need to see to it that the peak value of the luminance on the light emission plane 18a of the light guide plate unit 18 that corresponds to the parallel groove 18f is sufficiently reduced by modifying the sectional shape of the parallel groove 18f in the light guide plate unit 18; instead, one may reduce the peak value of luminance only to some extent and, at the same time, provide a gap between the diffusion film 14 and the light emission plane 18a of the light guide plate unit 18 so that the illuminating light emitted from the diffusion film 14 has a uniform distribution of luminance. In addition, there may be such a case that there is a limit to improvements that can be made on the sectional shape of the parallel groove 18f in the light guide plate 18 (to taper its bottom portion) so that the peak value of the luminance on the light emission plane 18a of the light guide plate unit 18 that corresponds to the parallel groove 18f cannot be reduced completely or sufficiently; in this case, too, one may provide a gap between the diffusion film 14 and the light emission plane 18a of the light guide plate unit 18 so that the illuminating light emitted from the diffusion film 14 has a uniform distribution of luminance.

In the next place, we describe the transmittance adjuster unit of the present invention.

The transmittance adjuster unit 28 according to the embodiment under consideration serves to reduce the luminance unevenness in the light emitted from the light guide plate unit 18 and it has a transparent film 29 and multiple transmittance adjusters 26 arranged on a surface of the transparent film 29.

The transparent film 29 is in the form of a film and disposed between the light guide plate 18 and the diffusion film 14. The transparent film 29 is formed of an optically transparent member such as PET (polyethylene terephthalate), PP (polypropylene), PC (polycarbonate), PMMA (polymethyl methacrylate), benzyl methacrylate, MS resin, other acrylic resins, or COP (cycloolefin polymer).

The transmittance adjusters 26 are dots of various sizes having a predetermined transmittance and they have square, circular, hexagonal or other geometries that are printed or otherwise formed across the surface on the side of the transparent film 29 closer to the light guide plate unit 18, in a specified pattern, say, a dotted pattern in which the size of dots and the number of dots that are arranged vary with the position.

The transmittance adjusters 26 may be a diffusive reflector that may be prepared by, for example, coating the surface with a material that scatters light, as exemplified by a pigment such as silica, titanium oxide or zinc oxide, a resin, or beads of glass or zirconium, together with a binder, or by finely embossing or polishing the surface to produce a surface roughened pattern. Other useful materials are ones that have high reflectance but low absorption of light, which may be exemplified by metals such as Ag and Al.

Figure 4:
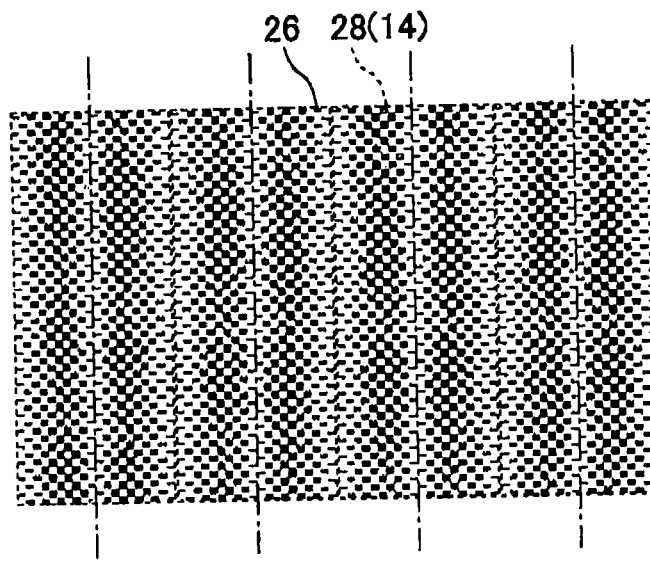
FIG. 4(a) is a diagram showing an exemplary arrangement pattern of transmittance adjusters that form the transmittance adjuster unit of the present invention, and (b) is a partial enlarged view of the arrangement pattern of the transmittance adjusters shown in (a).
Figure 4:
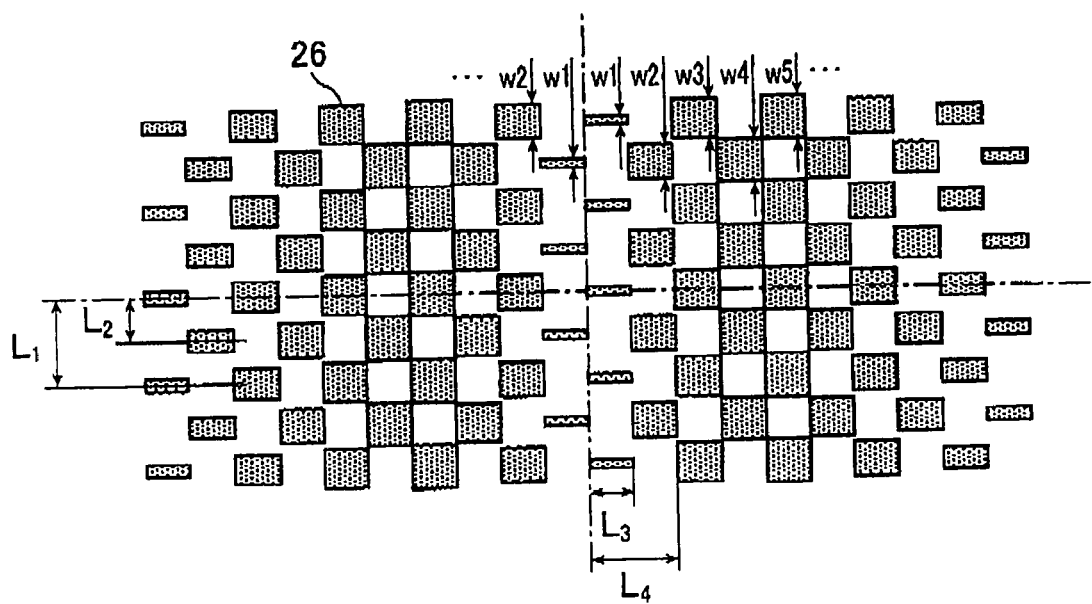

FIG. 4 shows an exemplary case of arranging the transmittance adjusters 26 in a dotted pattern. FIG. 4(a) is a diagrammatic view showing an exemplary pattern for the arrangement of the transmittance adjusters 26 that are laid on the transparent film 29, and FIG. 4(b) is an enlarged diagrammatic view showing enlarged that part of the pattern for the arrangement of the transmittance adjusters 26 shown in FIG. 4(a) which corresponds to a single light guide plate unit 18. In both FIGS. 4(a) and 4(b), the center of the light guide plate unit 18, or the center of the parallel groove 18f is indicated by a dot-and-dash line.

By thus arranging multiple transmittance adjusters 26 in a predetermined pattern on the surface of the transparent film 29 closer to the light guide plate unit 18, the pattern density of the transmittance adjusters 26 varies with their position on the surface.

Suppose here that the relative luminance of the light emitted from a given position (x,y) on the light emission plane of the backlight unit 2 (the side closer to the liquid crystal display panel 4) when the transmittance adjusters 26 are not provided, namely, the transmittance adjuster unit 28 is not present is written as F(x,y). Also suppose that the maximum and minimum luminances of the light emitted from the light emission plane of the diffusion film 14 in the backlight unit 2 when the transmittance adjuster unit 28 is not provided are written as $F_{max}$ and $F_{min}$, respectively, and that the relative luminance F(x,y) is referenced against the maximum luminance $F_{max}$ ($F_{max}$=1).

In this case, if the pattern density of the transmittance adjuster unit 28 at a given position (x,y) is written as ρ(x,y), the relationship between the pattern density ρ(x,y) of the transmittance adjuster unit 28 and the relative luminance F(x,y) satisfies the following Equation 1:

$$\rho(x,y)=c(F(x,y)-F_{min})/(F_{max}-F_{min}) \qquad \text{Eq. 1}$$

wherein c is the maximum density and preferably satisfies $0.5 \leq c \leq 1$.

In the present invention, the pattern density ρ(x,y) represents how much of a predetermined area is occupied by the transmittance adjusters 26; when ρ(x,y)=1, the transmittance adjusters 26 are arranged throughout the predetermined area, and when ρ(x,y)=0, there are no transmittance adjusters at all that are arranged within the predetermined area.

By arranging the transmittance adjusters 26 of the transmittance adjuster unit 28 in such a way as to satisfy the pattern density ρ(x,y) defined by Equation 1 set forth above, not only is it possible to suppress the drop in the average luminance of the light emitting from the light emission plane of the backlight unit 2 but one can also reduce the luminance irregularities of the light. Since the luminance irregularities are thus reduced by using the transmittance adjuster unit 28, it is no longer required of the diffusion film 14 to diffuse as much light as it can. As a result, the diffusion film 14 can be made thinner and the prism sheet can be omitted or a smaller number of prism sheets suffice, making it possible to provide a more lightweight and less costly backlight unit.

Here, as already mentioned, the maximum density c is preferably adjusted to satisfy the relation $0.5 \leq c \leq 1$. By adjusting the maximum density c to be at least 0.5, the drop in average luminance can also be suppressed to ensure the emission of bright and uniform light.

In addition, when the pattern density ρ(x,y) of the transmittance adjusters 26 is equal to unity, or the transmittance adjusters are arranged on the entire surface, they preferably provide a transmittance of 10% (inclusive) to 50% (inclusive), more preferably between 20% (inclusive) and 40% (inclusive).

If the transmittance is 10% or more, the luminance unevenness can be reduced advantageously; by providing a transmittance of 50% or less, the luminance irregularities can be reduced without lowering the average luminance.

These effects can be obtained more advantageously if the transmittance is adjusted to lie between 20% (inclusive) and 40% (inclusive).

In the embodiment under consideration, the transmittance adjusters arranged are of a square shape but this is not the sole case of the present invention and they may assume any other shapes, including triangular, hexagonal, circular and elliptical.

In addition, if a linear light source and a light guide plate unit in a uniaxially drawn form are used to construct a backlight unit as in the example under consideration, the transmittance adjusters may be shaped like an elongated strip parallel to the linear light source.

In the embodiment under consideration, the transmittance adjuster unit is provided between the light guide plate and the diffusion film but this is not the sole position that can be taken by the transmittance adjuster unit and it may be provided between the diffusion film and one of the prism sheets.

Figure 27:
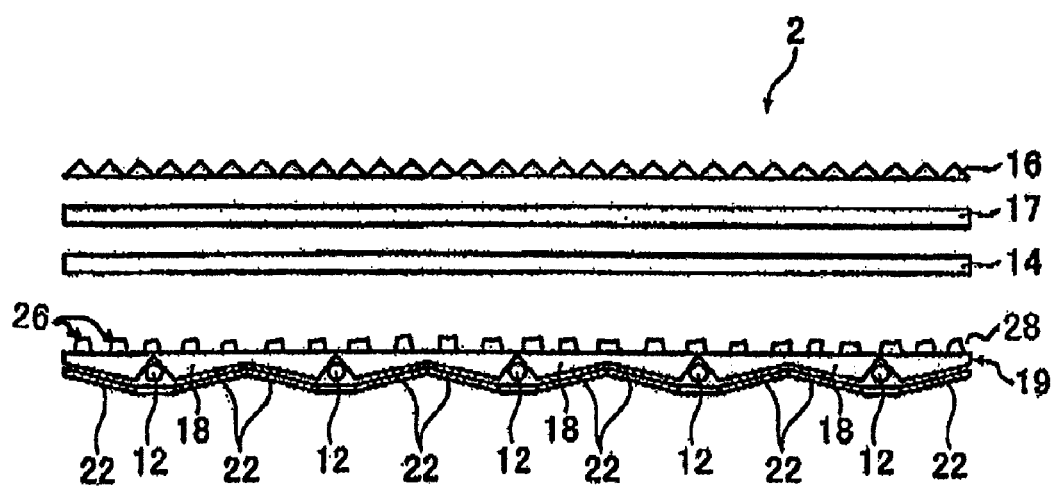
FIG. 27 is a diagrammatic sectional view showing another embodiment of the planar illumination device with the transmittance adjuster unit.
Figure 28:
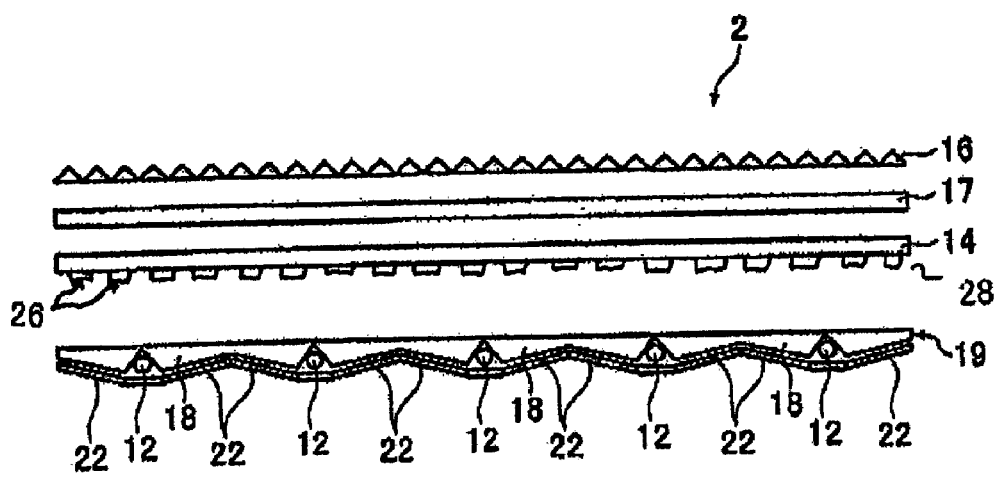
FIG. 28 is a diagrammatic section view showing another embodiment of the planar illumination device with the transmittance adjuster unit.
Figure 29:
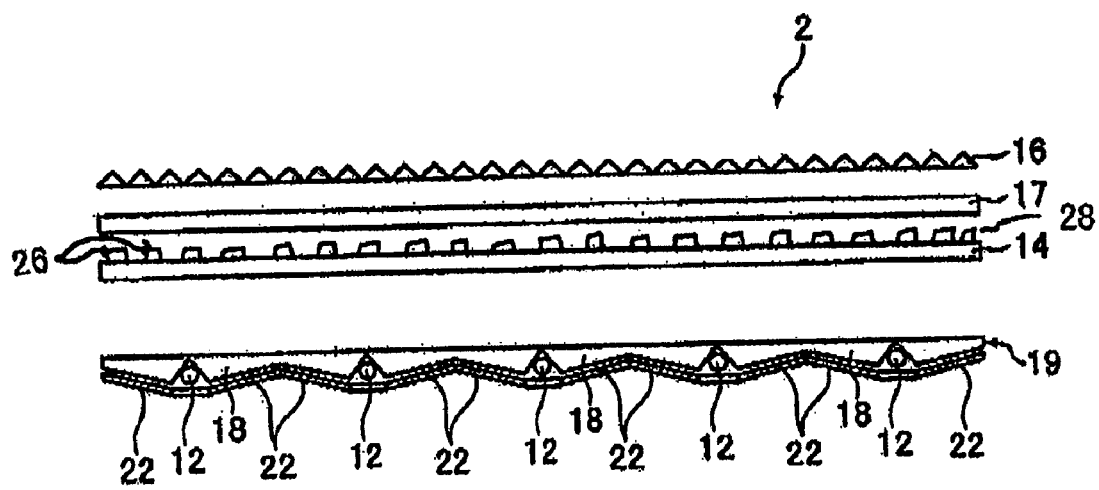
FIG. 29 is a diagrammatic section view showing another embodiment of the planar illumination device with the transmittance adjuster unit.
Figure 30:
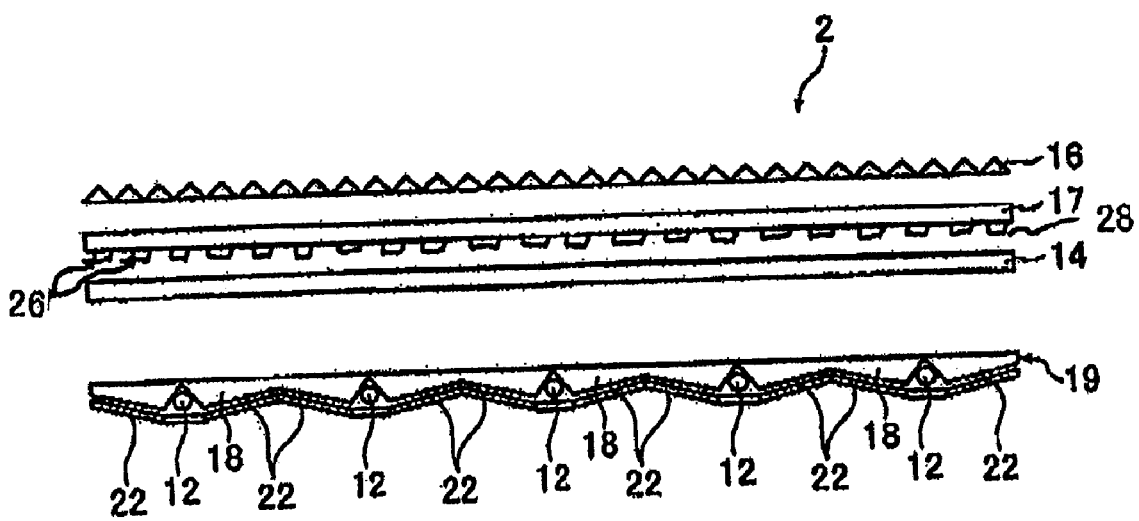
FIG. 30 is a diagrammatic section view showing another embodiment of the planar illumination device with the transmittance adjuster unit.
Figure 31:
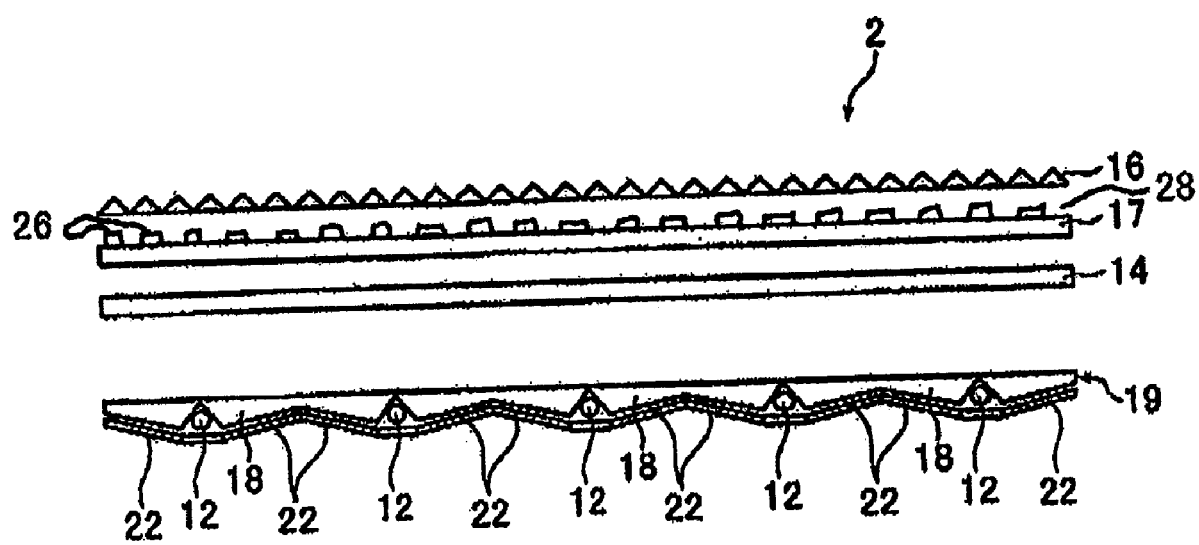
FIG. 31 is a diagrammatic section view showing another embodiment of the planar illumination device with the transmittance adjuster unit.

In addition, the transmittance adjuster unit is provided by placing the transmittance adjusters on a transparent film but this is not the sole case of the present invention and the transmittance adjuster unit may be provided by directly placing the transmittance adjusters on the side of the diffusion film closer to the light guide plate (the light entrance plane), as shown in FIG. 28, the side of the diffusion film away from the light guide plate (the light emission plane) as shown in FIG. 29, the side of the prism sheet closer to the light guide plate (the light entrance plane) as shown in FIG. 30, the side of the prism sheet away from the light guide plate (the light emission plane) as shown in FIG. 31, the light emission plane of the light guide plate, as shown in FIG. 27, or on other surfaces.

By thus providing the transmittance adjuster unit on a surface of the diffusion film, the prism sheet or the light guide plate, one can eliminate the need of using a transparent film in forming the transmittance adjuster unit, thereby further simplifying the layer arrangement. To add to this advantage, if the transmittance adjusters are directly placed on the light emission plane of the light guide plate, one can prevent relative displacement of the light guide plate and the transmittance adjuster, thereby eliminating the need to establish alignment during manufacture.

In addition, in the embodiment under consideration, the transmittance adjuster unit, the diffusion film and the prism sheets are superposed in that order on a side of the light guide plate closer to the emission plane. However, this is not the sole case of the present invention and the order in which the respective members are to be arranged on a side of the light guide plate closer to the emission plane is not limited in any particular way; in one alternative case, the transmittance adjuster unit, the prism sheets and the diffusion film may be superposed in that order on a side of the light guide plate closer to the emission plane.

Hereinafter, a backlight unit equipped with the transmittance adjuster unit is described more specifically together with a specific example.

As shown in FIG. 5(a), the backlight unit of the example under consideration which is generally indicated at 30 is composed of the light source 12, the diffusion film 14, the prism sheet 16, the light guide plate unit 18, the reflector 20, the reflective film 22, and the transmittance adjuster unit 28. Here, FIG. 5(a) shows only one light guide plate unit 18 but in the example under consideration, a light guide plate assembly 19 is employed that comprises a plurality of light guide plate units 18 coupled together.

In this example, a cold cathode tube with a diameter R of 2 mm was used as the light source 12; the light guide plate unit 18 was of a shape having the following dimensions: the distance L from the center of the light guide plate unit 18 to the face at which it was thinnest, or the face at which it joined to an adjacent light guide plate unit 18 was 15 mm; the thickness D of the thickest part of the thick portion 18b of the light guide plate unit 18 was 4.5 mm; the distance $d_1$ between the bottom portion of the parallel groove 18f and the light emission plane was 1 mm; the thickness $d_2$ of the light guide plate unit at the thinnest face was 1.5 mm; the width $G_1$ of the mouth of the parallel groove 18f which was away from the light emission plane 18a was 4 mm.

To calculate the pattern density ρ(x,y) of the transmittance adjuster unit 28 that would satisfy the above-shown Equation 1 in such backlight unit 30, a backlight unit 32 (see FIG. 5(b)) was used which had the same structure and shape except that it was not furnished with the transmittance adjuster unit 28, and a measurement was made of the relative luminance F(x,y) of the light emitted from the light emission plane of this backlight unit for the case where it was not furnished with the transmittance adjuster unit.

Here the relative luminance F(x,y) was measured in the following manner.

First, the light emission plane of the above-mentioned backlight unit 32 was fixed on an XY stage and a brightness meter was fixed normal to the light emission plane of this backlight unit 32. Then, the luminance of the backlight unit 32 at the position of the light emission plane was measured with the brightness meter to obtain information about luminance with respect to a particular position on the light emission plane of the light guide plate unit 18.

Figure 6:
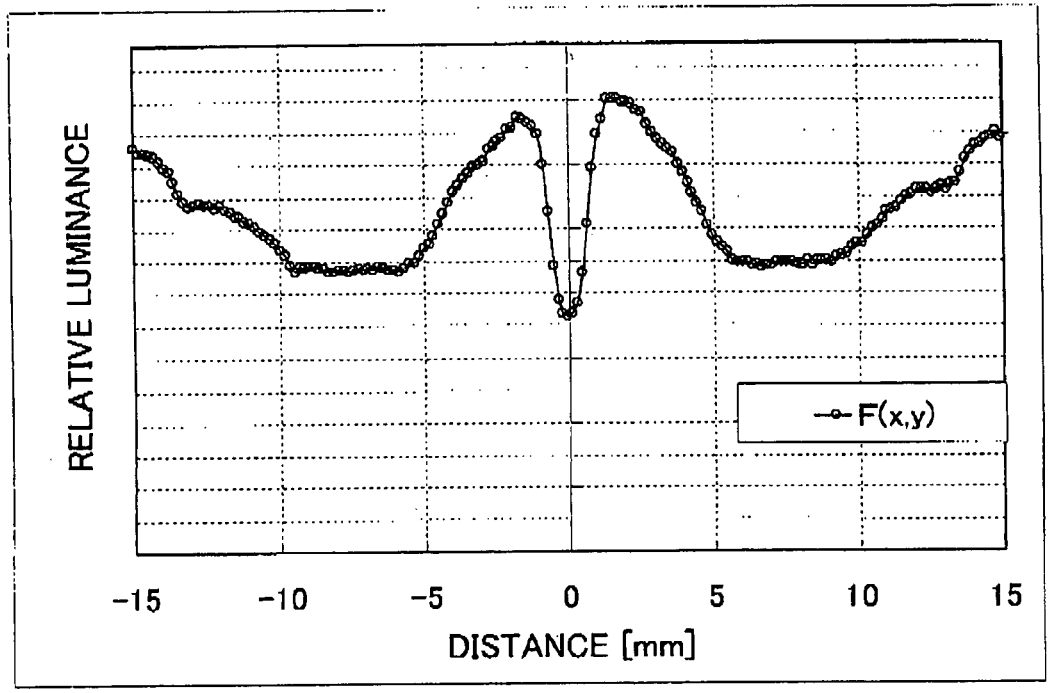
FIG. 6 is a graph showing an example of the relative luminance of the light emitted from the light emission plane of the planar illumination device shown in FIG. 5(b).

Subsequently, by moving the XY stage, the relationship between the position on the light emission plane of the backlight unit 32 and the luminance was determined; the maximum luminance calculated is written as $F_{max}$ and the minimum luminance as $F_{min}$. With the maximum luminance $F_{max}$ taken as unity, the luminance at a particular position relative to the maximum luminance $F_{max}$ is expressed as the relative luminance F(x,y) at that position (x,y). The results obtained by this measurement are shown in FIG. 6. The vertical axis of the graph in FIG. 6 plots the relative luminance and the horizontal axis plots the distance from the center of the light guide plate (the center of the parallel groove).

In the next step, the measured values of maximum luminance $F_{max}$ and minimum luminance Fm were substituted into the above-shown Equation 1 to calculate the pattern density ρ(x,y) corresponding to the relative luminance F(x,y). In the example under consideration, the relationship between the relative luminance F(x,y) and the pattern density ρ(x,y) was calculated for the cases where the maximum density c was adjusted to c=0.25, 0.5, 0.75 and 1, respectively. The results of calculation are shown in FIG. 7, in which the vertical axis plots the pattern density ρ(x,y) and the horizontal axis plots the relative luminance F(x,y).

Figure 7:
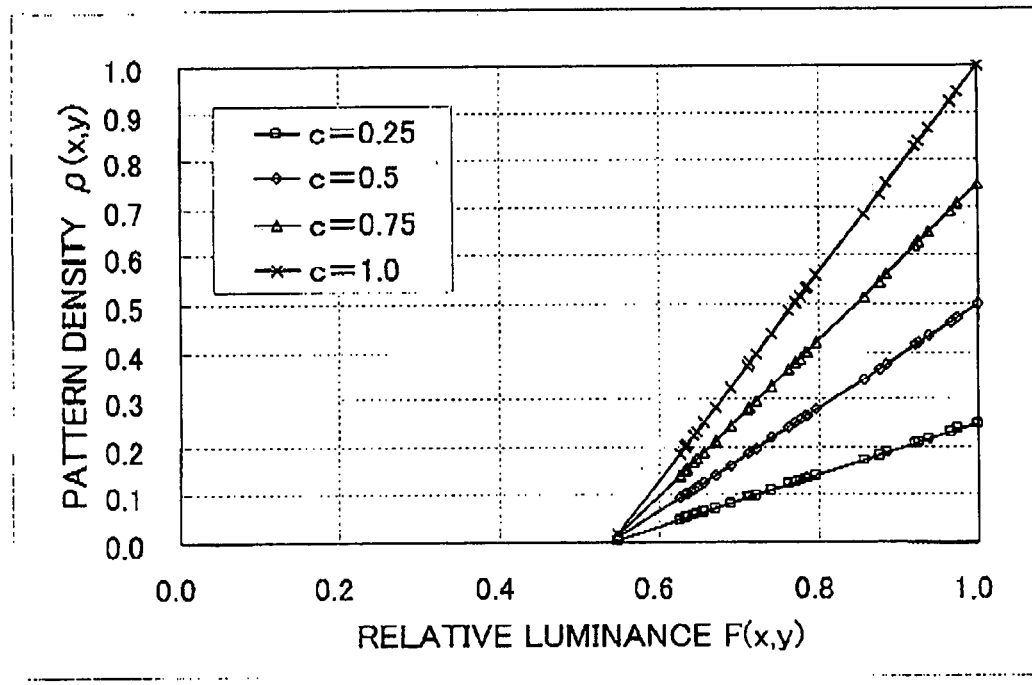
FIG. 7 is a graph depicting an example of the relationship between the relative luminance calculated from FIG. 6 and the pattern density.

As shown in FIG. 7, the relationship between the relative luminance F(x,y) and the pattern density ρ(x,y) is linear, with the pattern density ρ(x,y) assuming zero when the relative luminance F(x,y) is the minimum luminance Fin while being a maximum density c at the maximum luminance $F_{max}$.

Figure 8:
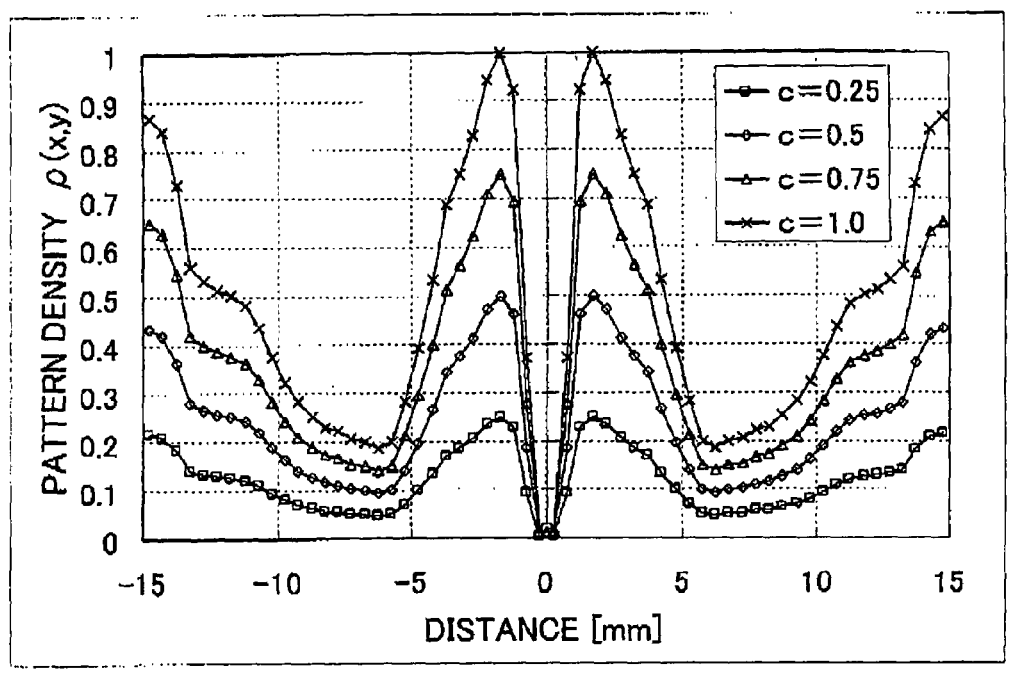
FIG. 8 is a graph showing the results of calculating the distributions of pattern density of the transmittance adjuster unit that satisfies the present invention when the maximum density is varied on the basis of the relative luminance calculated from FIG. 6.

Then, on the basis of the relationship between the relative luminance F(x,y) and the pattern density ρ(x,y) that is depicted in FIG. 7, calculation was made of the distributions of the pattern density ρ(x,y) that corresponds to the relative luminance F(x,y), shown in FIG. 6, of the backlight unit of the embodiment under consideration. FIG. 8 shows the distributions of the pattern density ρ(x,y) as calculated for the cases where the maximum density c was adjusted to c=0.25, 0.5, 0.75 and 1. In FIG. 8, the vertical axis plots the pattern density ρ(x,y) and the horizontal axis plots the distance from the center of the light guide plate (the center of the parallel groove).

In the next step, on the basis of the distributions of the pattern density ρ(x,y) that satisfied Equation 1 for the cases where the calculated maximum density c was adjusted to c=0.25, 0.5, 0.75 and 1, the transmittance adjusters 26 were arranged to prepare respective samples of the transmittance adjuster unit 28.

Figure 5:
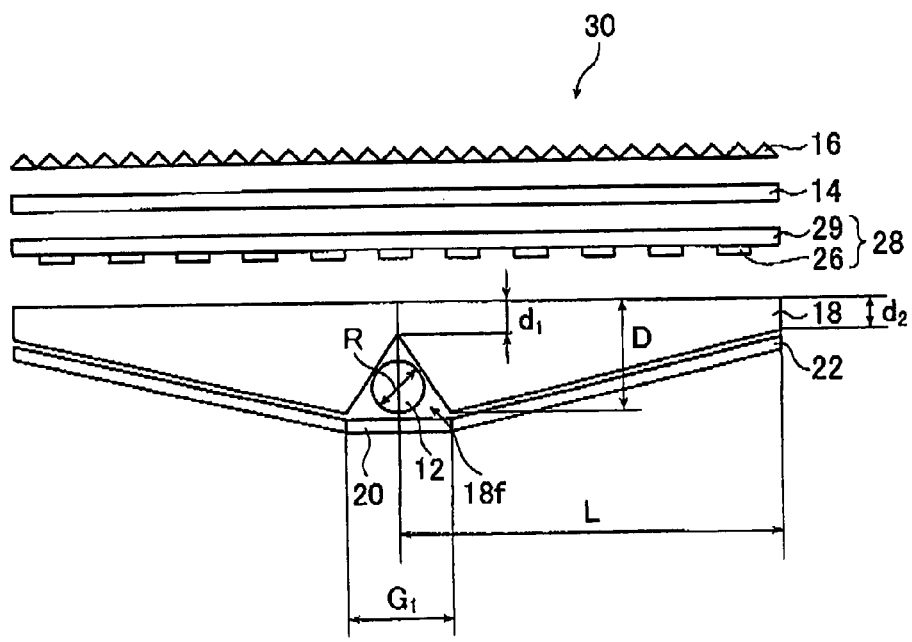
FIG. 5(a) is a diagrammatic sectional view showing a schematic composition of another example of the planar illumination device of the present invention, and (b) is a schematic compositional view for the case where only the transmittance adjuster unit has been removed from (a).
Figure 5:
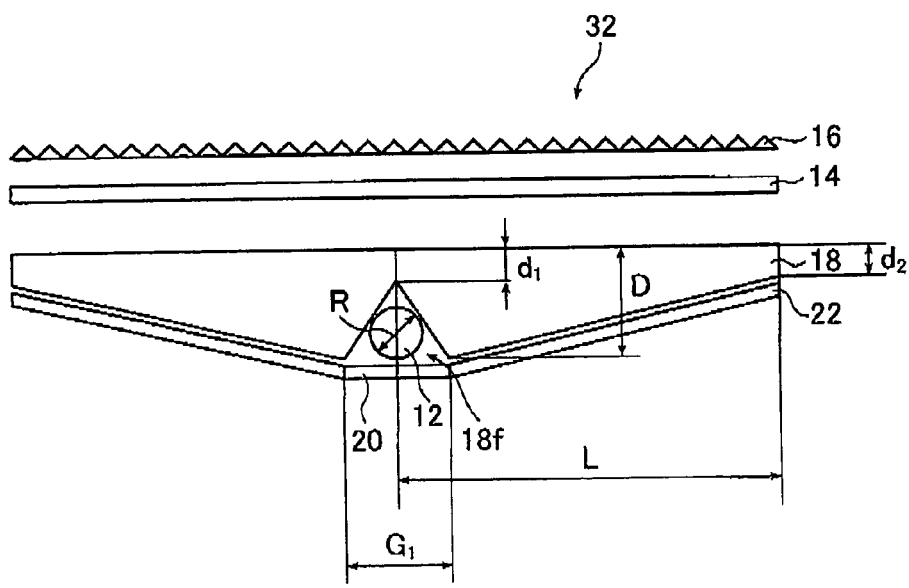

In the embodiment under consideration, the distributions of the pattern density ρ(x,y) were calculated for every 0.5 mm in the direction of width (transverse direction in FIG. 5(*a*)) and in accordance with the calculated pattern density ρ(x,y), the transmittance adjusters 26 whose size in the direction of width varied between 0 and 1 mm were appropriately arranged to prepare the transmittance adjuster unit 28. To be more specific, the transmittance adjuster unit 28 was prepared by arranging the transmittance adjusters 26 in such a way that $L_1$ and $L_4$ of the transmittance adjuster unit that are indicated in FIG. 4(*b*) were adjusted to $L_1=L_4=1.0$ mm, $L_2$ and $L_3$ adjusted to $L_2=L_3=0.5$ mm, and $w_1$-$w_4$ were adjusted to $0\text{ mm} \leq w \leq 1\text{ mm}$.

In the embodiment under consideration, the transmittance adjusters 26 that were arranged had been prepared in a white ink that would show a transmittance of 33% at a wavelength of 550 nm when they were arranged throughout, namely, at the pattern density ρ(x,y) of unity.

Figure 9:
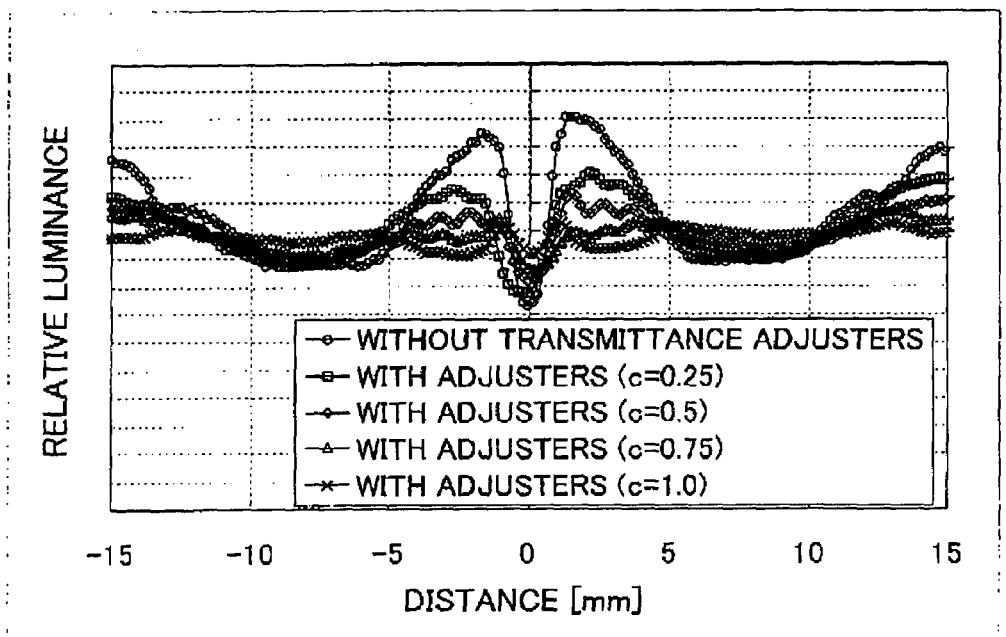
FIG. 9 is a graph showing the relative luminance of the light emitted from the light emission plane of a planar illumination device furnished with transmittance adjuster units having the pattern density distributions calculated from FIG. 8.

The samples thus prepared of the transmittance adjuster unit 28 were assembled in backlight units 30 and the relative luminance of the light emitted from the light emission plane of each backlight unit 30 was measured. The method of measurement was the same as what was used to measure the above-described relative luminance F(x,y). The results of the measurement are shown in FIG. 9, in which the vertical axis plots the relative luminance and the horizontal axis plots the distance from the center of the light guide plate (the center of the parallel groove). For comparison, FIG. 9 also shows the vertical luminance of the light emitted from the light emission plane of a backlight unit having the same structure except that it was not furnished with the transmittance adjuster unit 28.

As shown in FIG. 9, the provision of the transmittance adjuster unit helps reduce the luminance irregularities compared to the case where no transmittance adjuster unit is provided.

Furthermore, in the embodiment under consideration, luminance irregularities can be reduced to +10% or less by adjusting the maximum density c to be within the range of $0.5 \leq c \leq 1$.

As described above, by providing the transmittance adjuster unit 28 in which the transmittance adjusters 26 were arranged in such a way as to provide the pattern density ρ(x,y) calculated from the above-shown Equation 1 on the basis of the measured values of relative luminance F(x,y), the emitting light from the backlight unit 2 that contained persistent luminance irregularities as shown in FIG. 6 could be made more uniform.

Here, the transmittance adjusters 26 are preferably arranged in such a pattern that the width of one transmittance adjuster is not more than 0.1 mm. If the width is not more than 0.1 mm, the adjuster's size becomes smaller than the resolving power of the naked eye and when the transmittance adjusters 26 are actually used in a liquid crystal display device, their shapes will not be projected onto the light emission plane of the backlight unit to produce luminance irregularities and this contributes to efficient reduction of luminance irregularities.

Here in the embodiment under consideration, the distribution of pattern density was adjusted by changing the size of the transmittance adjusters; however, this is not the sole case of the present invention and the pattern density can also be adjusted by controlling the spacing at which the transmittance adjusters of a given shape are arranged.

As described above, by forming the transmittance adjusters into a given shape and adjusting their pattern density in terms of the spacing of arrangement, one can prevent the transmittance adjusters from becoming so large as to be projected onto the light emission plane of the backlight unit, as well as preventing the dot size from becoming so small as to introduce difficulty in forming the transmittance adjusters.

We now describe another specific example with reference to FIGS. 10-14.

Figure 10:
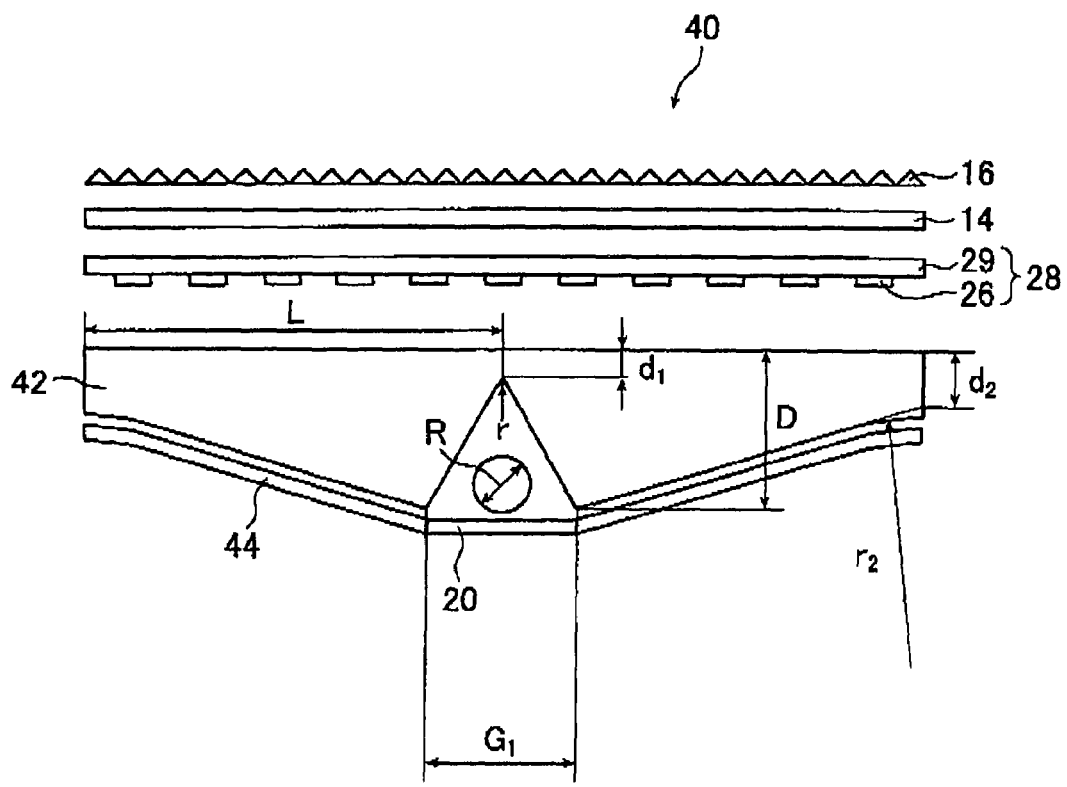
FIG. 10 is a schematic compositional view showing another embodiment of the planar illumination device of the present invention.

As shown in FIG. 10, the backlight unit according to the embodiment under consideration has basically the same shape and structure except that the light guide plate is of a different shape. Therefore, like structural components are identified by like numerals without giving detailed description thereof, and mostly the differences will be described below.

The light guide plate of the embodiment under consideration was of a shape having the following dimensions: the distance L from the center of the light guide plate unit 18 to the face at which it was thinnest, or the face at which it joined to an adjacent light guide plate unit 18 was 15 mm; the thickness D of the thickest part of the thick portion 18*b* of the light guide plate unit 18 was 5.5 mm; the distance $d_1$ between the bottom portion of the parallel groove 18*f* and the light emission plane was 0.9 mm; the thickness $d_2$ of the light guide plate unit at the thinnest face was 2 mm; the width $G_1$ of the mouth of the parallel groove 18*f* which was away from the light emission plane 18*a* was 5.3 mm; the radius of curvature r of the bottom portion of the parallel groove 18*f* which was assumed to have a curved shape was 0.25 mm; the inclined rear surface of the joint to an adjacent light guide plate unit, when assumed to have a smooth curved shape, had a radius of curvature of 15 mm. The light source 12 was a cold cathode tube whose diameter R was 2.6 mm.

To calculate the pattern density ρ(x,y) of the transmittance adjuster unit 28 that would satisfy the above-shown Equation 1 in such backlight unit 40, a backlight unit was used which had the same structure and shape except that it was not furnished with the transmittance adjuster unit 28, and a measurement was made of the relative luminance F(x,y) of the light emitted from the light emission plane of this backlight unit for the case where it was not furnished with the transmittance adjuster unit.

Figure 11:
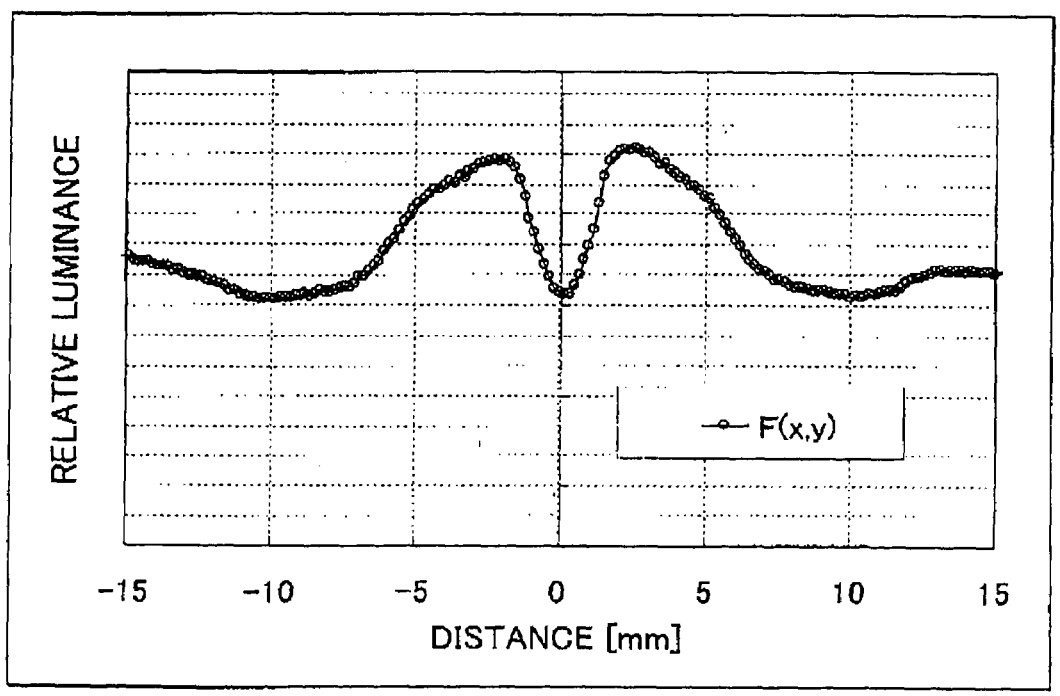
FIG. 11 is a graph showing the relative luminance of the light emitted from the light emission plane of a planar illumination device which is identical to the planar illumination device shown in FIG. 10 except that the transmittance adjuster unit has been removed.

Using the same method as in the embodiment described above, vertical luminance (x,y) was measured and the relationship between the position on the light emission plane of the backlight unit 40 and the luminance was determined; the maximum luminance calculated is written as $F_{max}$ and the minimum luminance as $F_{min}$. With the maximum luminance $F_{max}$ taken as unity, the luminance at a particular position relative to the maximum luminance $F_{max}$ is expressed as the relative luminance F(x,y) at that position (x,y). The results obtained by this measurement are shown in FIG. 11. The vertical axis of the graph in FIG. 11 plots the relative luminance and the horizontal axis plots the distance from the center of the light guide plate (the center of the parallel groove).

In the next step, the measured values of maximum luminance $F_{max}$ and minimum luminance $F_{min}$ were substituted into the above-shown Equation 1 to calculate the pattern density ρ(x,y) corresponding to the relative luminance F(x,y). In the example under consideration, the relationship between the relative luminance F(x,y) and the pattern density ρ(x,y) was calculated for the cases where the maximum density c was adjusted to c=0.25, 0.5, 0.75 and 1, respectively. The results of calculation are shown in FIG. 12, in which the vertical axis plots the pattern density $\rho(x,y)$ and the horizontal axis plots the relative luminance $F(x,y)$.

Figure 12:
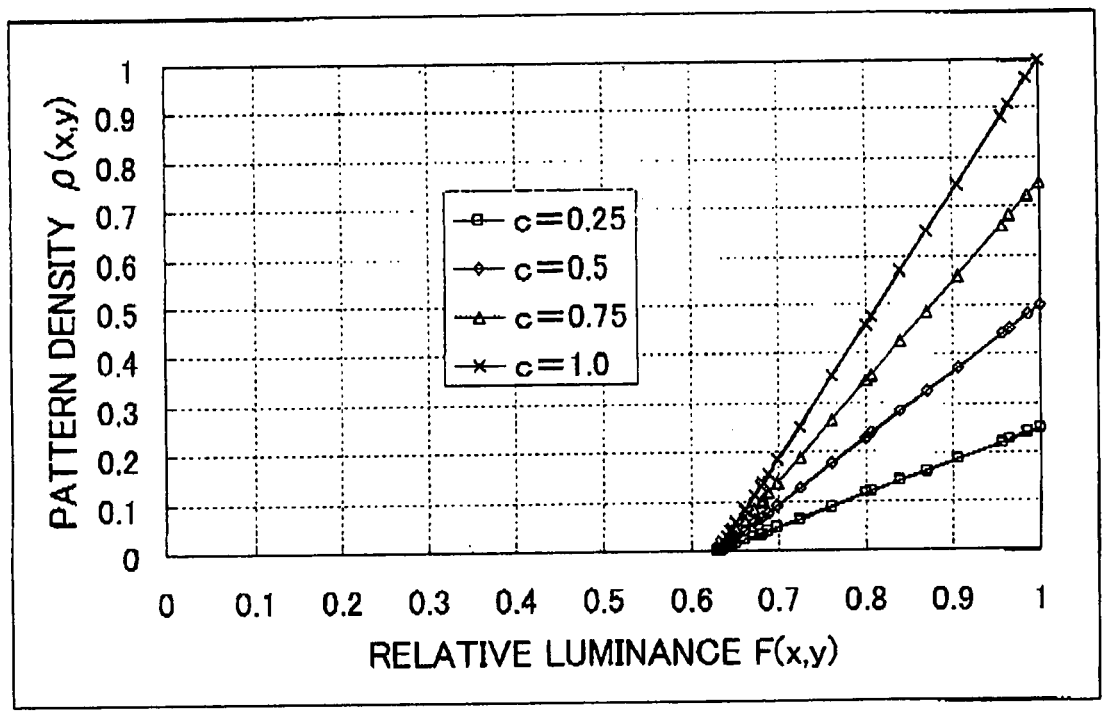
FIG. 12 is a graph depicting the relationship between the relative luminance calculated from FIG. 11 and the pattern density.

As shown in FIG. 12, the relationship between the relative luminance $F(x,y)$ and the pattern density $\rho(x,y)$ is linear, with the pattern density $\rho(x,y)$ assuming zero when the relative luminance $F(x,y)$ is the minimum luminance $F_{min}$ while being a maximum density c at the maximum luminance $F_{max}$.

Figure 13:
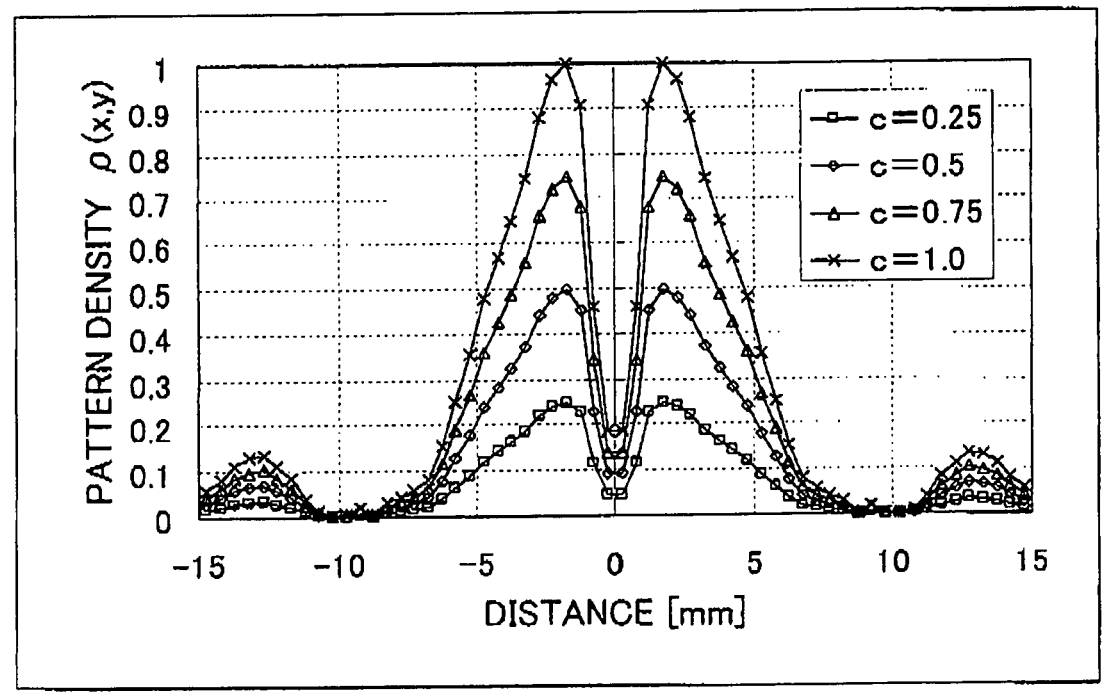
FIG. 13 is a graph showing the results of calculating the distributions of pattern density of the transmittance adjuster unit that satisfies the present invention when the maximum density is varied on the basis of the relative luminance calculated from FIG. 11.

Then, on the basis of the relationship between the relative luminance $F(x,y)$ and the pattern density $\rho(x,y)$ that is depicted in FIG. 12, calculation was made of the distributions of the pattern density $\rho(x,y)$ that corresponds to the relative luminance $F(x,y)$, shown in FIG. 11, of the backlight unit of the embodiment under consideration. FIG. 13 shows the results of calculation. Similarly to FIG. 12, FIG. 13 shows the distributions of the pattern density $\rho(x,y)$ as calculated for the cases where the maximum density c was adjusted to c=0.25, 0.5, 0.75 and 1. In FIG. 13, the vertical axis plots the pattern density $\rho(x,y)$ and the horizontal axis plots the distance from the center of the light guide plate (the center of the parallel groove).

In the next step, on the basis of the distribution of the pattern density $\rho(x,y)$ that satisfied Equation 1 for the cases where the calculated maximum density c was adjusted to c=0.25, 0.5, 0.75 and 1, the transmittance adjusters 26 were arranged to prepare respective samples of the transmittance adjuster unit 28.

Figure 14:
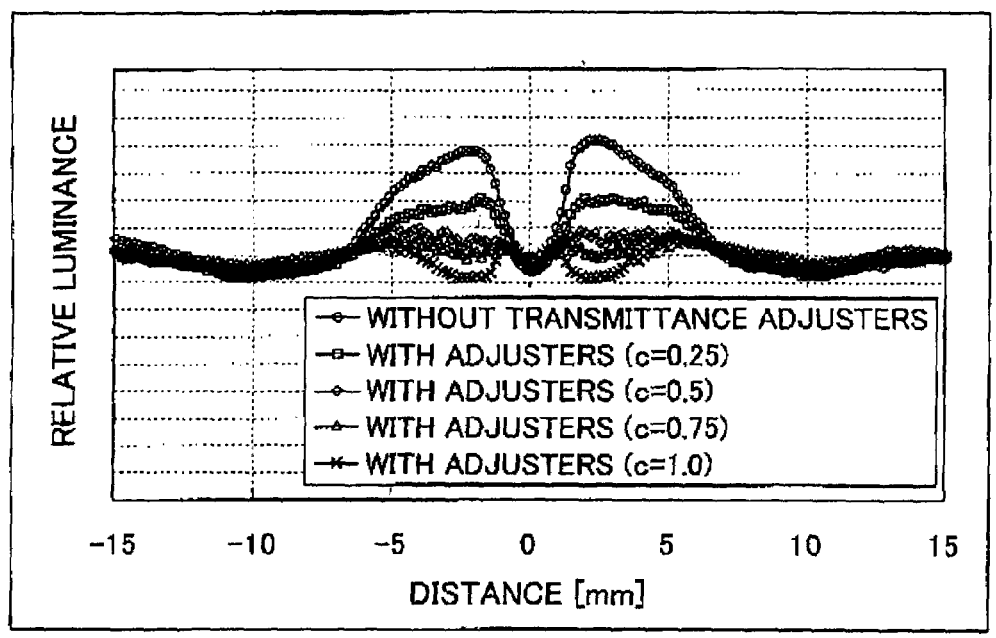
FIG. 14 is a graph showing the relative luminance of the light emitted from the light emission plane of a planar illumination device furnished with transmittance adjuster units having the pattern density distributions calculated from FIG. 13.

The samples thus prepared of the transmittance adjuster unit 28 were assembled in backlight units 30 and the relative luminance of the light emitted from the light emission plane of each backlight unit 30 was measured. The method of measurement was the same as what was used to measure the above-described relative luminance $F(x,y)$. The results of the measurement are shown in FIG. 14, in which the vertical axis plots the relative luminance and the horizontal axis plots the distance from the center of the light guide plate (the center of the parallel groove). For comparison, FIG. 14 also shows the vertical luminance of the light emitted from the light emission plane of a backlight unit having the same structure except that it was not furnished with the transmittance adjuster unit.

As shown in FIG. 14, the example under consideration also has the advantage that provision of the transmittance adjuster unit helps reduce the luminance irregularities compared to the case where no transmittance adjuster unit is provided.

From the foregoing, it can be concluded that irrespective of the shape of the light guide plate and the characteristics of the luminance irregularities, the provision of the transmittance adjuster unit that satisfies the above-shown Equation 1 helps reduce the luminance irregularities without lowering the average luminance.

Furthermore, in the embodiment under consideration, too, luminance irregularities can be reduced to ±10% or less by adjusting the maximum density c to be within the range of $0.5 \leq c \leq 1$.

Here, the planar illuminating device of the present invention may have a diffuser provided on the side of the prism sheet closer to the light emission plane, namely, closer to the liquid crystal display panel.

Figure 15:
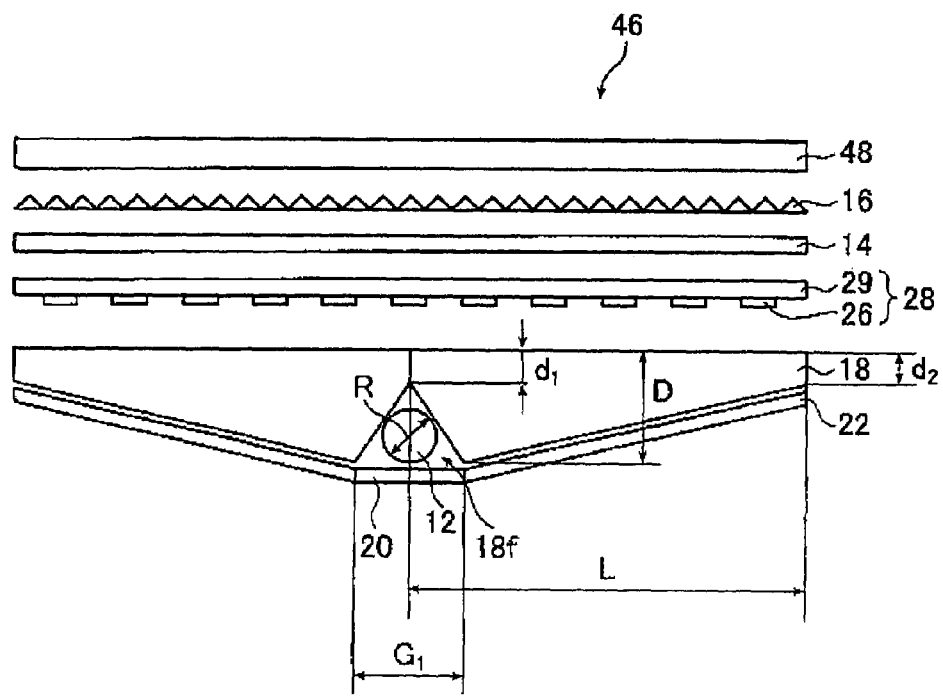
FIG. 15 is a schematic compositional view showing yet another embodiment of the planar illumination device of the present invention.

Hereinafter, a backlight unit 46 furnished with a diffuser 48 is described in detail together with FIG. 15. Here, the backlight unit 46 is of the same structure and shape as the backlight unit 30 shown in FIG. 5(a) except that it is furnished with the diffuser 48; hence, like members are identified by like numerals, and mostly the differences will be described below.

The diffuser 48 is provided on the side of the prism sheet 16 closer to the light emission plane, namely, closer to a liquid crystal display panel not shown and it is formed by imparting a light diffusing property to a film-shaped member that is made of an optically transparent resin such as PET (polyethylene terephthalate), PP (polypropylene), PC (polycarbonate), PMMA (polymethyl methacrylate), benzyl methacrylate, an MS resin, other acrylic resins or COP (cycloolefinic polymer). The method of forming the diffuser 48 is not particularly limited but it may be formed by, for example, imparting diffusing property to the surface of the above-described member in the form of a flat plate through fine embossing or polishing so as to roughen it (hereinafter, the thus treated surface is referred to as a "sanded surface"), or by coating the surface with a material that scatters light, as exemplified by a pigment such as silica, titanium oxide or zinc oxide, a resin, or beads of glass or zirconium, together with a binder, or by kneading the aforementioned resin with the above-mentioned pigment or beads that scatter light. In the present invention, the diffuser 48 may be of a matted or coated type.

Figure 16:
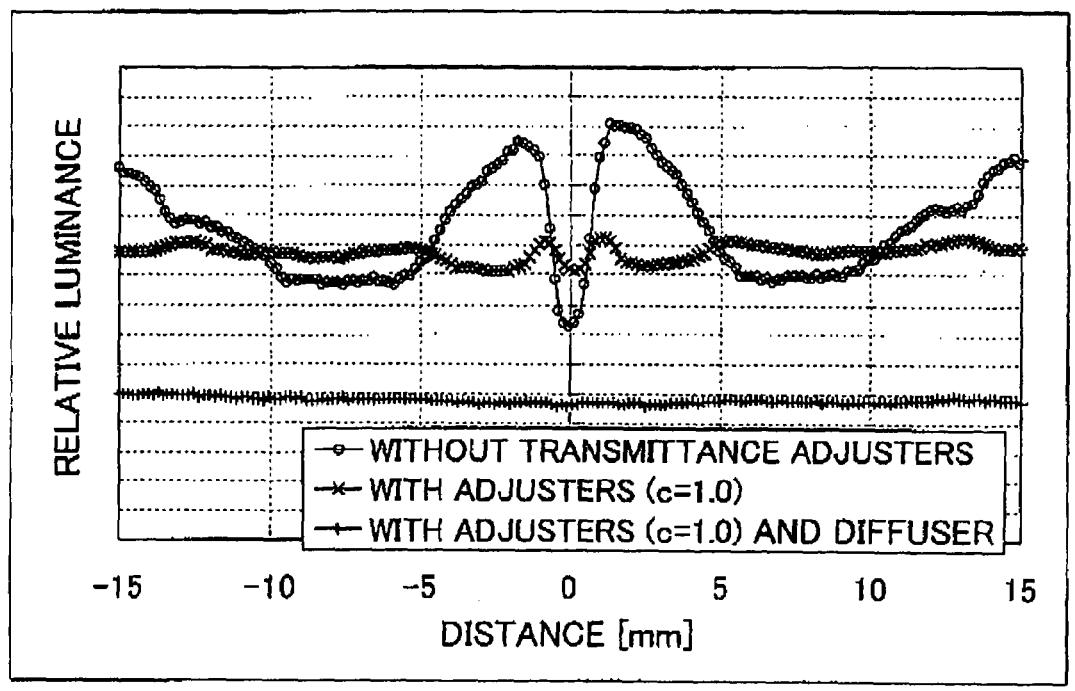
FIG. 16 is a graph showing the relative luminance of the light emitted from the light emission plane of the planar illumination device shown in FIG. 15.

Here, the transmittance adjuster unit 28 in the above-described backlight unit 46 was replaced by one of the transmittance adjuster units referred to in FIG. 9 which had the maximum density at c=1 and a diffuser with a thickness of 2 mm was provided on the side of the prism sheet 16 closer to the light emission plane and a relative luminance measurement was conducted by the same method as in the embodiment already described above. The results of the measurement are shown in FIG. 16, in which the vertical axis plots the relative luminance and the horizontal axis plots the distance from the center of the light guide plate (the center of the parallel groove). For comparison, FIG. 16 also shows the relative luminance of the light emitted from the light emission plane of a backlight unit having the same structure except that it was not furnished with the transmittance adjuster unit or the diffuser, as well as the relative luminance of the light emitted from the light emission plane of a backlight unit having the transmittance adjuster unit of c=1 that is referred to in FIG. 9.

By thus providing the diffuser, average luminance dropped on account of the drop in directivity but a further improvement in luminance irregularities was possible. Here, the provision of the transmittance adjuster unit helps reduce the luminance irregularities efficiently, so uniform light can be emitted even if the diffuser is thinner and capable of a smaller degree of diffusion than in the prior art.

Here, the light guide plate to be used in the backlight unit is preferably of the shape shown in the embodiment already described above, which comprises a rectangular light emission plane, a thick portion parallel to one side of the rectangular light emission plane and positioned substantially in its center, thin end portions formed parallel to the thick portion, a parallel groove for accommodating a rod of light source which is formed substantially in the center of the thick portion and parallel to said one side, and inclined rear-surface portions on opposite sides of the parallel groove that are symmetrical with respect to a plane including the axis of the rod-shaped light source and normal to the rectangular light emission plane and which decrease in thickness from the thick portion toward the thin end portions so as to form inclined surfaces. By using this shape of light guide plate, the luminance irregularities in the light emitted from the light guide plate can be reduced, enabling the provision of a backlight unit having an even smaller amount of luminance irregularities.

Figure 17:
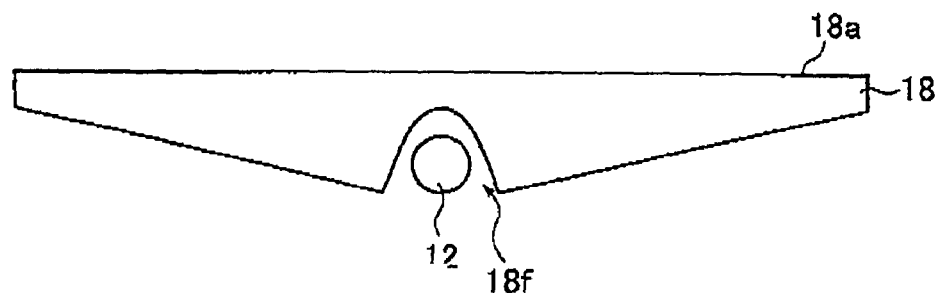
FIG. 17 is a schematic sectional view showing another embodiment of the light guide plate to be used in the present invention.
Figure 18:
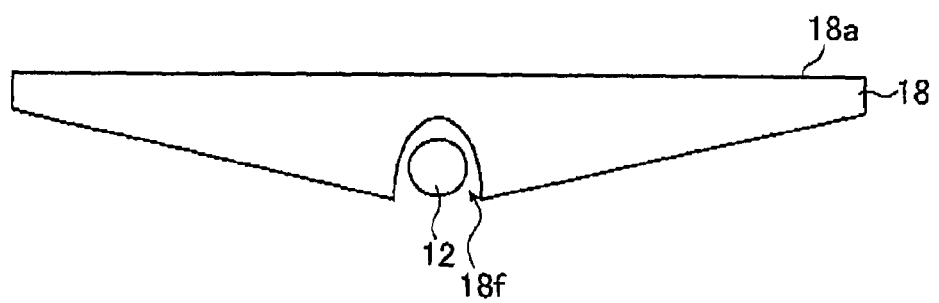
FIG. 18 is a schematic sectional view showing another embodiment of the light guide plate to be used in the present invention.

In the embodiment under consideration, the sectional shape of the parallel groove 18f in the light guide plate unit 18 is triangular, but the parallel groove 18f may have any sectional shape that is symmetrical with respect to a center line passing through the deepest portion or the center of the parallel groove 18f and extending normal to the light emission plane of the light guide plate unit 18, and which is tapered toward the light emission plane 18a; for example, as shown in FIGS. 17 and 18, a hyperbolic or elliptical sectional shape may be adopted. Alternatively, the parallel groove 18f in the light guide plate unit 18 may have a catenarian sectional shape.

Alternatively, the parallel groove may have such a sectional shape that the deepest portion of the parallel groove (the joint of the sidewalls constituting the parallel groove) forms a pointed end. More specifically, the sectional shape of the parallel groove at the bottom portion may be such that it is defined by segments of two curved or straight lines that meet each other to form a sharp intersection and which are symmetrical with respect to a center line passing through the center of the parallel groove and extending normal to the light emission plane of the light guide plate. In the present invention, the parallel groove in the light guide plate having any of the above sectional shapes enables uniform light to emit from the light emission plane of the light guide plate.

Figure 19:
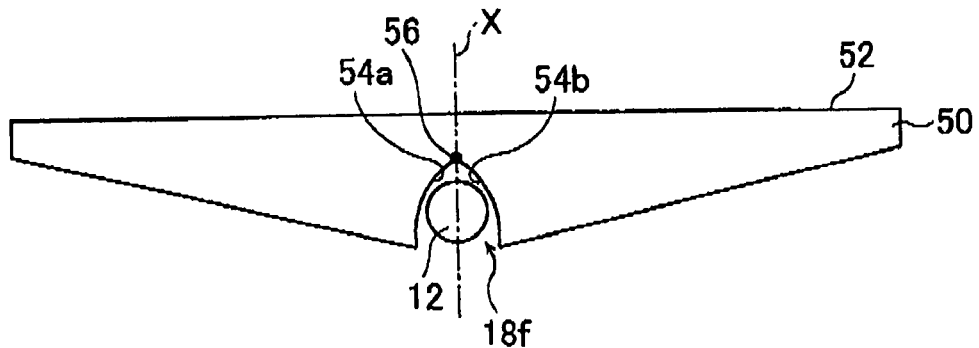
FIG. 19 is a schematic sectional view showing another embodiment of the light guide plate to be used in the present invention.

FIG. 19 shows an example of the case where the sectional shape of the parallel groove at the bottom portion is such that it is defined by segments of two curved lines that meet each other to form a sharp intersection and which are symmetrical with respect to a center line passing through the center of the parallel groove 18f and extending normal to the light emission plane of the light guide plate. In the light guide plate 50 shown in FIG. 19, two curved lines 54a and 54b that are symmetrical with respect to the center line X passing trough the center of the parallel groove and extending normal to the light emission plane 52 of the light guide plate 50 are each an arc. In this case, as FIG. 19 shows, the two arcs 54a and 54b are formed in such a way that the center position of the arc 54a corresponding to one of the two sidewalls that form the parallel groove 18f is shifted from the center position of the arc 54b corresponding to the other sidewall. Consequently, the intersection 56 at which the two sidewalls in an arc form meet takes on a pointed shape as shown in FIG. 19.

Figure 20:
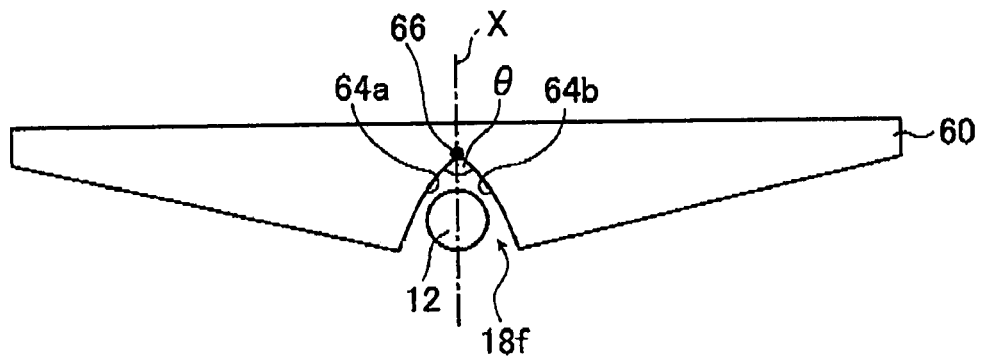
FIG. 20 is a schematic sectional view showing another embodiment of the light guide plate to be used in the present invention.

FIG. 20 shows yet another example of the case where the sectional shape of the parallel groove at the bottom portion is such that it is defined by segments of two curved lines that meet each other to form a sharp intersection and which are symmetrical with respect to a center line passing through the center of the parallel groove and extending normal to the light emission plane of the light guide plate. In the light guide plate 60 shown in FIG. 20, two curved lines 64a and 64b that are symmetrical with respect to the center line X passing trough the center of the parallel groove 18f and extending normal to the light emission plane of the light guide plate are each a parabola. In FIG. 20, the sidewalls of the parallel groove 18f are formed in such a way that the focal point of the parabola 64a corresponding to one of the two sidewalls that form the parallel groove 18f is shifted from the focal point of the parabola 64b corresponding to the other sidewall.

In the case shown in FIG. 20 where the sectional shape of the parallel groove at the bottom portion is such that it is defined by the two curved lines 64a and 64b that meet at the intersection 66, the angle θ formed between a tangent that touches the curved line 64a corresponding to one of the two sidewalls of the parallel groove 18f at the intersection (pointed end) 64 and another tangent that touches the curved line 64b corresponding to the other sidewall at the intersection 64 is preferably 90 degrees or less, more preferably 60 degrees or less.

Figure 21:
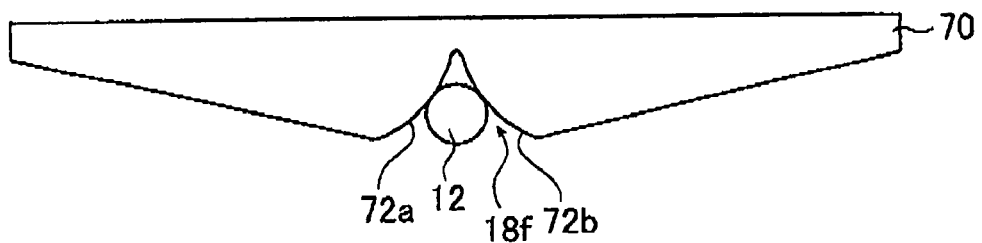
FIG. 21 is a schematic sectional view showing another embodiment of the light guide plate to be used in the present invention.
Figure 22:
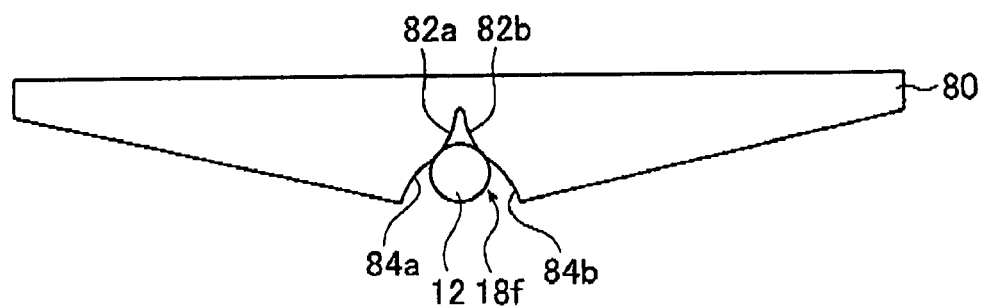
FIG. 22 is a schematic sectional view showing another embodiment of the light guide plate to be used in the present invention.

While FIGS. 1 to 20 show examples of the light guide plate in which the sectional shape of the parallel groove is such that the curved lines forming the sidewalls of the parallel groove are concave toward the center of the parallel groove; other embodiments of the light guide plate of the present invention which are different from these are shown in FIGS. 21 and 22. FIG. 21 shows an exemplary light guide plate 70 in which the parallel groove 18f has a sectional shape defined by two curved lines 72a and 72b that are convex toward the center of the parallel groove 18f, and FIG. 22 shows an exemplary light guide plate 80 in which the parallel groove 18f has a sectional shape defined by curved lines 82a and 82b that are convex toward the center of the parallel groove 18f and combined with curved lines 84a and 84b that are concave. The light guide plates 70 and 80 having parallel grooves with the sectional shapes shown in FIGS. 21 and 22, respectively, also contribute to emission of light with sufficient illuminance from the light emission plane while suppressing the generation of bright lines.

As described above, the parallel groove in the light guide plate has such a sectional shape that those portions which correspond to the parallel groove may be formed in a curved line that is convex or concave toward the center of the parallel groove or they may extend in a straight line or even a combination of curved lines and straight lines may be employed. The curved lines are by no means limited to the illustrated cases of arcs and they may be segments of ellipses, parabolas, hyperboles or any other curved lines that are either convex or concave toward the center of the parallel groove. Furthermore, in the present invention, as long as the bottom portion of the parallel groove has a tapered sectional shape as described below, the curved lines that define the parallel groove may be segments of ellipses, parabolas, hyperbolas or any other curved lines that are either convex or concave toward the center of the parallel groove; they are preferably curved lines that can be approximated by a tenth-order mathematical function.

Needless to say, the peak (deepest portion) of the bottom portion of the parallel groove may have such a sectional shape that one sharp intersection that is symmetrical with respect to the centerline of the parallel groove assumes a chamfered level plane or a rounded circular arc; it may even assume an elliptical, parabolic, or hyperbolic shape. Further in addition, the peak (deepest portion) of the bottom portion of the parallel groove may be sanded as mentioned above to thereby reduce the peak value of illuminance.

It should further be noted that illuminance and luminance can be treated in generally the same way on the surface of the light guide plate. Therefore, by similarly designing the light guide plate in terms of luminance to have the shapes described above, it should of course be possible to provide uniform luminance across the light emission plane of the light guide plate.

In the first embodiment of the light guide plate to be used in the backlight unit (planar illumination device) of the present invention, it is preferred that the bottom portion of the parallel groove 18f in the light guide plate unit 18 is tapered according to the ratio that the peak value of a bright line (the peak value of the illuminance) observed at a portion (the first portion) corresponding to the parallel groove 18f in the light emission plane 18a of the light guide plate unit 18 has with respect to the average value of the illuminance measured at a portion other than the parallel groove 18f in the light emission plane 18a of the light guide plate unit 18, that is, a portion corresponding to the inclined rear surfaces 18d (the second portion); to be specific, the degree by which the bottom portion of the parallel groove 18f in the light guide plate unit 18 is tapered is preferably controlled according to that ratio. In this case, the ratio is preferably set at 3 or less, more preferably 2 or less as in the second embodiment to be described later.

Note that this ratio is preferably set according to the thickness of the backlight unit 2 (the distance between the light emission plane 18a of the light guide plate unit 18 and the diffusion film 14), the diffusion efficiency of the diffusion film 14 used in the backlight unit 2 or the number of diffusion films, or the diffusion efficiency of the prism sheets 16, 17 and 23 or the number of the prism sheets used, and other factors. That is, in the case where the thickness of the backlight unit 2 (the distance between the light emission plane 18a of the light guide plate unit 18 and the diffusion film 14) can be somewhat larger (or increased), or in the case where the diffusion efficiency of the diffusion film 14 used in the backlight unit 2 is so high that more diffusion films can be used, or in the case where the diffusion efficiency of the prism sheets 16, 17, and 23 is so high that more prism sheets can be used, diffusing (e.g. mixing) of the illuminating light emitting from the light emission plane 18a of the light guide plate unit 18 can be sufficiently performed; hence, notwithstanding the inevitable higher cost, the ratio of the peak value of the illuminance at the first portion of the light emission plane 18a of the light guide plate unit 18 to the average value of the illuminance at the second portion of the light emission plane 18a of the light guide plate unit 18 can be set at a fairly large value. Otherwise, however, the ratio of interest needs to be set smaller although cost reduction is possible.

In the second embodiment of the light guide plate which is to be used in the planar illumination device of the present invention, the bottom portion of the parallel groove 18f in the light guide plate unit 18 is tapered such that the peak value of the illuminance at the first portion of the light emission plane 18a of the light guide plate unit 18 is not more than three times, preferably not more than twice, the average value of the illuminance at the second portion of the light emission plane 18a of the light guide plate unit 18. Here, by setting the peak value of the illuminance at the first portion of the light emission plane 18a of the light guide plate unit 18 to be not more than three times the average value of the illuminance at the second portion of the light emission plane 18a of the light guide plate unit 18, the illuminance distribution of the illuminating light emitting from the light emission plane 18a of the light guide plate unit 18 can be made more uniform than in the prior art.

As a result, the illuminating light emitting from the light emission plane 18a of the light guide plate unit 18 need not be diffused (e.g. mixed) to a very large extent.

By adopting such light guide plate, the planar illumination device of the present invention permits the use of an inexpensive diffusion film 14 having no markedly high diffusion efficiency and it also allows for a reduction in the number of such diffusion films that must be used; in addition, expensive types of prism sheets 16, 17 and 23 can be totally omitted; alternatively, less expensive versions of prism sheets 16, 17 and 23 that have no markedly high diffusion efficiency can be used or the number of such prism sheets that must be used can be reduced. As a result, an even lighter and less expensive backlight unit can be provided.

In the light guide plate to be used in the backlight unit of the present invention, the sectional shape of the parallel groove 18f in the light guide plate unit 18 is preferably such that the bottom portion of the parallel groove 18f which is to be tapered forms a combined angle of not greater than 90 degrees, more preferably not greater than 60 degrees, as measured in two opposite directions away from the normal line (X) extending from the center of the light source 12 in rod shape toward the light emission plane 18a. To be more specific, that portion of the parallel groove 18f which is to be tapered in the present invention in order to reduce the peak value of the illuminance at the first portion of the light emission plane 18a of the light guide plate unit 18 which corresponds to the parallel groove 18f may be the entire part of the parallel groove 18f; however, only a selected bottom portion may be tapered insofar as the peak value of illuminance can be reduced.

Here, the light guide plate to be used in the backlight unit of the present invention is by no means limited to the embodiments described above and various other shapes of light guide plate can be employed.

Figure 23:
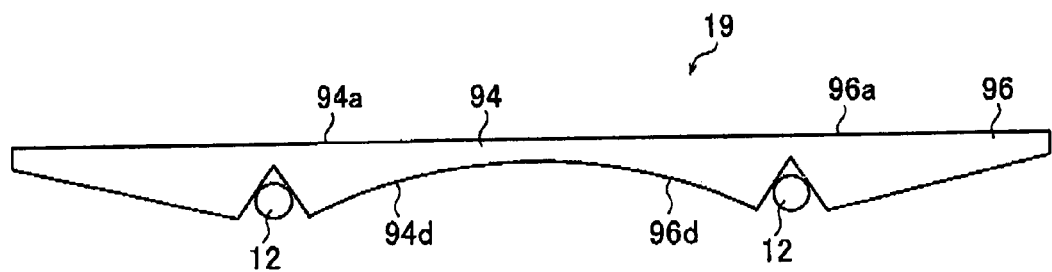
FIG. 23 is a schematic sectional view showing another embodiment of the light guide plate to be used in the present invention.

For example, in the present invention, as FIG. 23 shows, light guide plate units 94 and 96 may be placed side by side in such a way that the light emission planes 94a and 96a of these light guide plate units 94 and 96 are all flush with each other to thereby constitute a light guide plate of a larger size. When the light guide plate units 94 and 96 are placed side by side in this way, the angle at which the inclined surfaces 94d and 96d of the light guide plate units 94 and 96 slope can be adjusted such that the inclined surface 94d of one light guide plate unit 94 does not cross the inclined surface 96d of the other light guide plate unit 96 which connects to the light guide plate unit 94, namely, such that a smooth flat or curved plane will be formed at the portion where those inclined surfaces are coupled to each other. In the light guide plate shown in FIG. 23, the surface defined by the inclined surfaces 94d and 96d of the light guide plate units 94 and 96, respectively, is in an arch shape. Note that the light guide plate units 94 and 96 shown in FIG. 23 have basically the same construction as the light guide plate unit 18 shown in FIG. 3 and will not be described in detail.

Using the light guide plate having such large-size light emission planes 94a and 96a, one can produce a backlight unit having a large-size light illuminating surface, which hence can be applied to a liquid crystal display device having a large-size display screen, in particular, a wall-hung type liquid crystal display device such as a wall-hung TV.

As described above, the light guide plate according to the present invention is such that in order to form a larger light guide plate by coupling a plurality of light guide plate units, the thin portions of separately molded light guide plate units are coupled together. Alternatively, from the viewpoint of production efficiency, it is preferable that as many light guide plate units as are necessary to form a light guide plate comparable to the required screen size may be molded monolithically.

Figure 24:
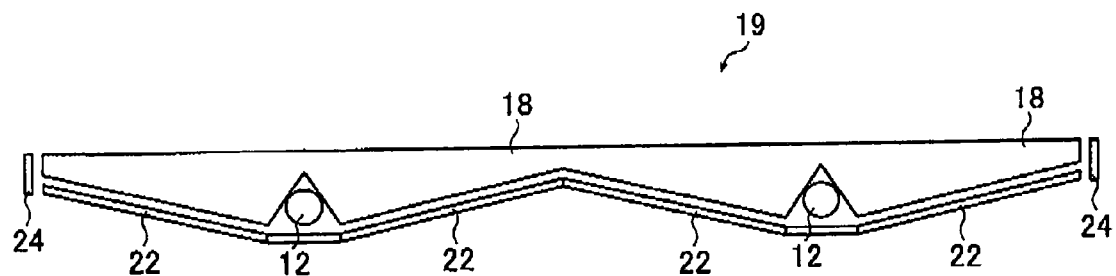
FIG. 24 illustrates how light guide plates, light sources and reflector plates are arranged side by side for use in the present invention.
Figure 25:
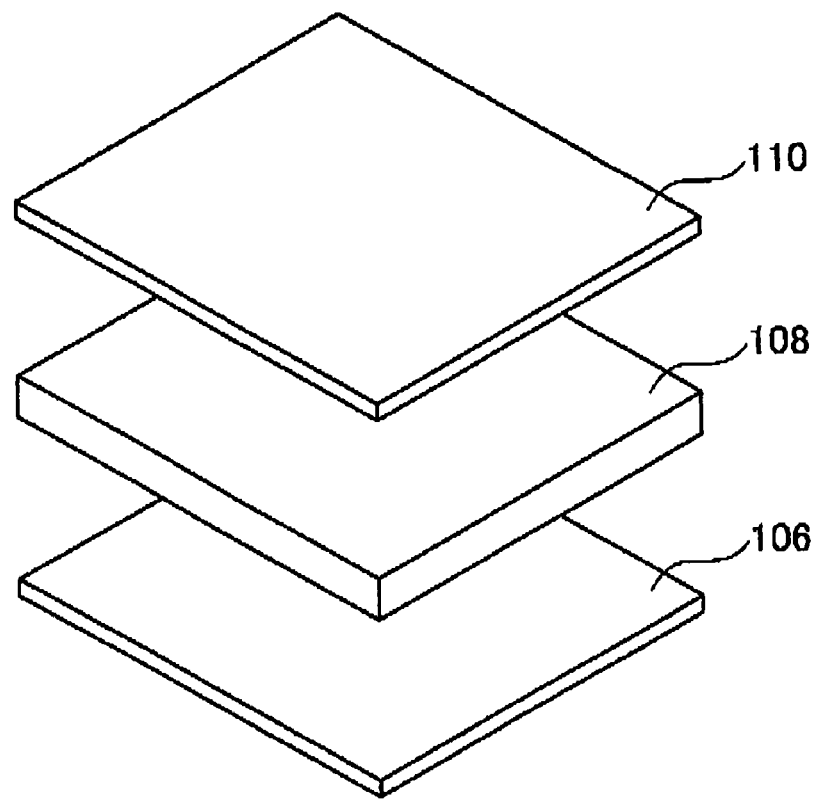
FIG. 25 is an exploded perspective view of an area light source device having a conventional light guide plate.
Figure 25:
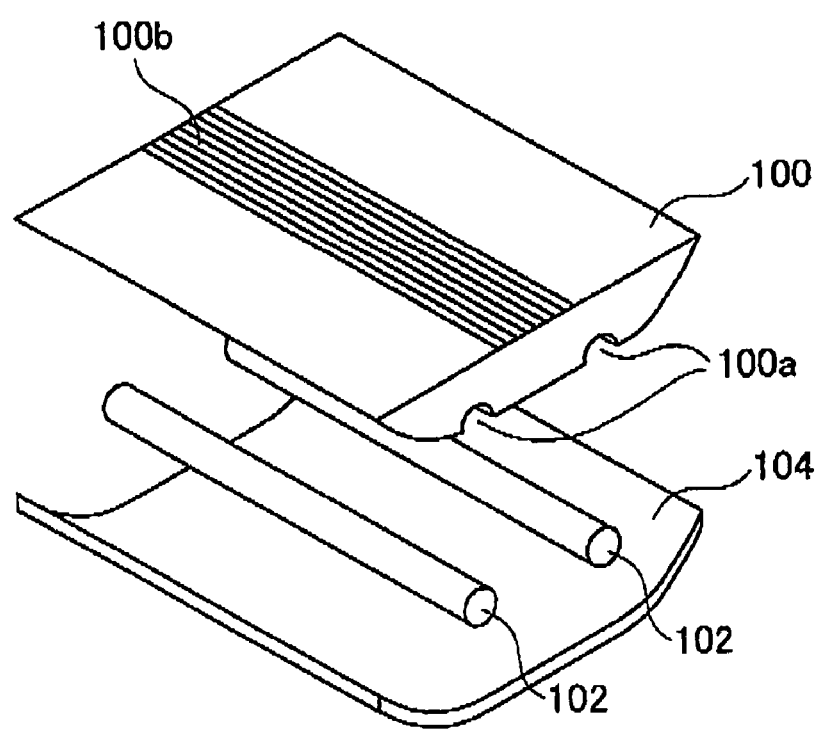
Figure 26:
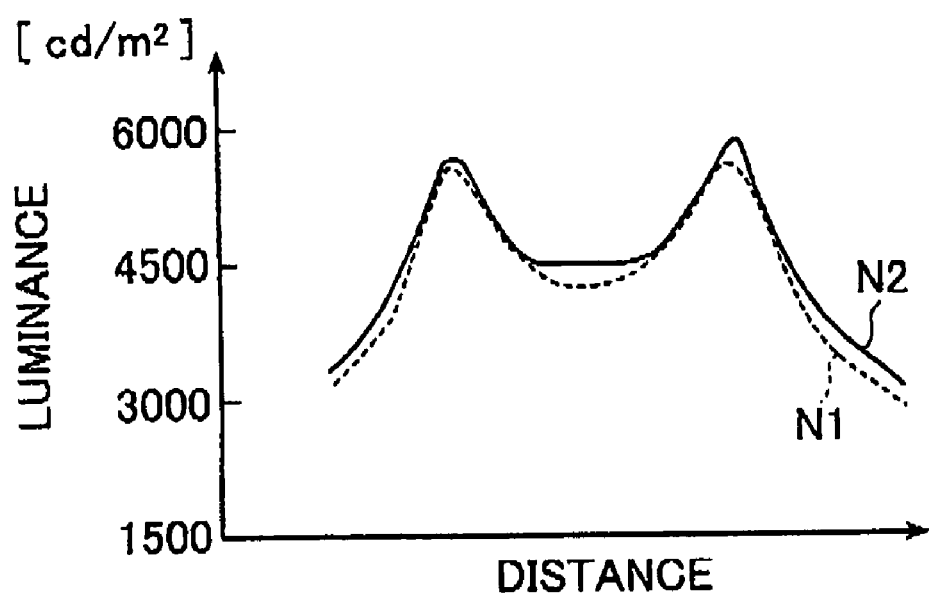
FIG. 26 is a graph showing the luminance on the emission plane of the light guide plate in the area light source device shown in FIG. 25.

Another possible embodiment of the light guide plate of the present invention is shown in FIG. 24, in which a reflector plate 24 is provided on a lateral side of each of the light guide plate units 18 that are positioned on the outermost side. Such reflector plates 24 effectively prevent the leakage of light from the lateral sides of the light guide plate units 18, thereby contributing to an even higher utilization of light. It should be noted here that the reflector plates 24 may be formed of the same material as used to make the aforementioned reflective sheet or reflector.

Here, the transmittance adjuster unit of the present invention is by no means limited to the shapes described on the foregoing pages and it may be applied in backlight units and liquid crystal display devices that employ various shapes of light guide plates including a tandem type and a direct-illumination type.

While the diffusion film of the present invention, as well as the backlight unit and liquid crystal display device that are provided with this diffusion film have been described above in detail, the present invention is by no means limited to the above embodiments and various improvements and changes may of course be made without departing from the gist of the present invention.

The invention claimed is:

1. A transmittance adjuster unit that is provided on a side closer to a light emission plane of a light guide plate of a planar illumination device, wherein the planar illumination device has at least a light source and the light guide plate that causes light incident from the light source to emit from the light emission plane thereof, said transmittance adjuster unit comprising:
   multiple transmittance adjusters arranged in a predetermined pattern to receive light from the light emission plane,
   wherein a pattern density of the transmittance adjusters at a predetermined position (x,y) is p(x,y),
   wherein a relative luminance F(x,y) is a ratio of a luminance of light emitted from the predetermined position (x,y) of a light emission plane of the planar illumination device when the transmittance adjuster unit is not provided to a maximum luminance of light emitted from the light emission plane of the planar illumination device when the transmittance adjuster unit is not provided,
   wherein the relationship between the relative luminance F(x,y) and the pattern density of the transmittance adjusters p(x,y) satisfies the following expression:

$$p(x,y)=c(F(x,y)-F_{min})/(1-F_{min})$$

wherein c satisfies $0.5 \leq c \leq 1$ and $F_{min}$ is minimum value of the relative luminance F(x,y).

2. The transmittance adjuster unit according to claim 1, comprising a film of transparent member on which the transmittance adjusters are arranged.

3. The transmittance adjuster unit according to claim 1, wherein the transmittance adjusters are arranged in a dotted pattern.

4. The transmittance adjuster unit according to claim 1, wherein the transmittance adjusters provide a transmittance between 10% and 50%.

5. A planar illumination device comprising:
   a light source;
   a light guide plate that causes incident light from the light source to emit from a light emission plane thereof;
   a reflective sheet provided on a surface of the light guide plate away from the light emission plane;
   a reflector provided on a facing side of the light guide plate with the light source interposed;
   a diffusion film provided on the light emission plane of the light guide plate; and
   a transmittance adjuster unit that is provided on any one surface of the light emission plane of the light guide plate, a surface of the diffusion film closer to the light guide plate and an opposite surface of the diffusion film away from the light guide plate, and that comprises multiple transmittance adjusters arranged in a predetermined pattern,
   wherein, a pattern density of the transmittance adjusters at a predetermined position (x,y) of the transmittance adjuster unit is p(x,y),
   wherein a relative luminance F(x,y) is a ratio of a luminance of light emitted from the predetermined position (x,y) of a light emission plane of the planar illumination device when the transmittance adjuster unit is not provided to a maximum luminance of light emitted from the light emission plane of the planar illumination device when the transmittance unit is not provided,
   wherein the relationship between the relative luminance F(x,y) and the pattern density of the transmittance adjusters p(x,y) satisfies the following expression:

$$p(x,y)=c(F(x,y)-F_{min})/(1-F_{min})$$

wherein c satisfies $0.5 \leq c \leq 1$ and $F_{min}$ is minimum value of the relative luminance F(x,y).

6. The planar illumination device according to claim 5, further comprising: a prism sheet arranged on at least one of a surface of the diffusion film closer to the light guide plate and an opposite surface of the diffusion film away from the light guide plate.

7. A planar illumination device comprising:
   a light source;
   a light guide plate that causes incident light from the light source to emit from a light emission plane thereof;
   a reflective sheet provided on a surface of the light guide plate away from the emission plane;
   a reflector provided on a facing side of the light guide plate with the light source interposed;
   a diffusion film provided on the light emission plane of the light guide plate;
   a prism sheet arranged on at least one of a surface of the diffusion film closer to the light guide plate and an opposite surface of the diffusion film away from the light guide plate; and
   a transmittance adjuster unit that is provided on any one surface of the light emission plane of the light guide plate, a surface of the prism sheet closer to the light guide plate, an opposite surface of the prism sheet away from the light guide plate, the surface of the diffusion film closer to the light guide plate, and the opposite surface of the diffusion film away from the light guide plate, and that comprises multiple transmittance adjusters arranged in a predetermined pattern,
   wherein a pattern density of the transmittance adjusters at a predetermined position (x,y) of the transmittance adjuster unit is p(x,y),
   wherein a relative luminance F(x,y) is a ratio of a luminance of light emitted from the predetermined position (x,y) of a light emission plane of the planar illumination device when the transmittance adjuster unit is not provided to a maximum luminance of light emitted from the light emission plane of the planar illumination device when the transmittance unit is not provided,
   wherein the relationship between the relative luminance F(x,y) and the pattern density of the transmission adjusters p(x,y) satisfies the following expression:

$$p(x,y)=c(F(x,y)-F_{min})/(1-F_{min})$$

wherein c satisfies $0.5 \leq c \leq 1$ and $F_{min}$ is minimum value of the relative luminance F(x,y).

8. The planar illumination device according to claim 5, wherein the transmittance adjuster unit comprises a film formed of a transparent member on which the transmittance adjusters are arranged.

9. The planar illumination device according to claim 5, wherein the transmittance adjusters are arranged in a dotted pattern.

10. The planar illumination device according to claim 5, wherein the transmittance adjusters provide a transmittance 10% and 50%.

11. The planar illumination device according to claim 5, wherein the light guide plate is composed of:
    a rectangular light emission plane;
    a thick portion parallel to one side of the rectangular light emission plane and positioned substantially in its center;

thin end portions formed parallel to the thick portion;
a parallel groove for accommodating the light source, which is formed substantially in the center of the thick portion and parallel to said one side, and
inclined rear-surface portions on opposite sides of the parallel groove that are symmetrical with respect to a plane including an axis of the light source and normal to the light emission plane and which decrease in thickness from the thick portion toward the thin end portions.

12. The planar illumination device according to claim 5, wherein the transmittance adjuster unit is provided on any one surface of the diffusion film closer to the light guide plate and an opposite surface of the diffusion film away from the light guide plate.

13. A liquid crystal display device comprising:
a backlight unit comprising a planar illumination device comprising: a light guide source; and a light guide plate that causes incident light from the light source to emit from a light emission plane thereof;
a liquid crystal display panel provided on a side of the backlight unit closer to the light emission plane of the planar illumination device; and
a drive unit for driving the backlight unit and the liquid crystal display panel,
wherein the planar illumination device further comprises;
a reflective sheet provided on a surface of the light guide plate away from the light emission plane;
a reflector provided on a facing side of the light guide plate with the light source interposed;
a diffusion film provided on the light emission plane of the light guide plate; and
a transmittance adjuster unit that is provided on any one surface of the light emission plane of the light guide plate, a surface of the diffusion film closer to the light guide plate and an opposite surface of the diffusion film away from the light guide plate, and that comprises multiple transmittance arranged in a predetermined pattern, and a pattern density of the transmittance adjusters at a predetermined position (x,y) p(x,y),
wherein a relative luminance $F(x,y)$ is a ratio of a luminance of light emitted from the predetermined position (x,y) of the light emission plane of the planar illumination device when the transmittance adjuster unit is not provided to a maximum luminance of light emitted from the light emission plane of the planar illumination device when the transmittance unit is not provided,
wherein the relationship between the relative luminance $F(x,y)$ and the pattern density of the transmittance adjusters $p(x,y)$ satisfies the following expression:

$$p(x,y)=c(F(x,y)F_{min})/(1-F_{min})$$

wherein c satisfies $0.5 \leq c \leq 1$ and $F_{min}$ is minimum value of the relative luminance $F(x,y)$.

14. The liquid crystal display device according to claim 13, wherein the planar illumination device further comprises:
a prism sheet arranged on at least one of a surface of the diffusion film closer to the light guide plate and an opposite surface of the diffusion film away from the light guide plate, and
wherein the transmittance adjuster unit is provided on any one surface of the light emission plane of the light guide plate, a surface of the prism sheet closer to the light guide plate, an opposite surface of the prism sheet away from the light guide plate, the surface of the diffusion film closer to the light guide plate, and the opposite surface of the diffusion film away from the light guide plate.

15. A method of arranging multiple transmittance adjusters to construct a transmittance adjuster unit that is provided on a side closer to a light emission plane of a light guide plate of a planar illumination device, wherein the planar illumination device has at least a light source and the light guide plate that causes light incident from the light source to emit from the light emission plane thereof, wherein the transmittance adjusters are provided such that a pattern density of the transmittance adjusters at a predetermined position (x,y) of the transmittance adjuster unit is $p(x,y)$, relative luminance $F(x,y)$ is a ratio of a luminance of light emitted from the predetermined position (x,y) of a light emission plane of the planar illumination device when the transmittance adjuster unit is not provided to a maximum luminance of light emitted from the light emission plane of the planar illumination device when the transmittance unit is not provided, wherein the relationship between the relative luminance $F(x,y)$ and the pattern density of the transmittance adjusters $p(x,y)$ satisfies the following expression:

$$p(x,y)=c\{F(x,y)-F_{min}\}/(1-F_{min})$$

wherein c satisfies $0.5 \leq c \leq 1$ and $F_{min}$ is minimum value of the relative luminance $F(x,y)$.

* * * * *